US010769419B2

(12) United States Patent
Rodriguez Bravo et al.

(10) Patent No.: US 10,769,419 B2
(45) Date of Patent: Sep. 8, 2020

(54) DISRUPTOR MITIGATION

(71) Applicant: International Business Machines Corporation, Armonk, NY (US)

(72) Inventors: Cesar Augusto Rodriguez Bravo, Alajuela (CR); Gregory J. Boss, Saginaw, MI (US); Bernadette Pierson, South Hero, VT (US); Jayashree Vaidyanathan, Cincinnati, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

(21) Appl. No.: 16/133,432

(22) Filed: Sep. 17, 2018

(65) Prior Publication Data

US 2020/0089939 A1    Mar. 19, 2020

(51) Int. Cl.
*G06F 15/16* (2006.01)
*G06K 9/00* (2006.01)
(Continued)

(52) U.S. Cl.
CPC ..... *G06K 9/00335* (2013.01); *G06K 9/00778* (2013.01); *G06K 9/00892* (2013.01);
(Continued)

(58) Field of Classification Search
CPC ......... H04L 51/04; H04L 51/32; H04L 67/22; H04L 43/0876; H04W 4/021
(Continued)

(56) References Cited

U.S. PATENT DOCUMENTS 8,195,598 B2 * 6/2012 Hua .................. G06N 5/02
706/62
8,977,619 B2 * 3/2015 Mann ................ G06F 16/29
707/736
(Continued)

OTHER PUBLICATIONS

Anonymously; "Method and System for Sensing Group State Based on a Combination of Wearable Sensor Data"; http://ip.com/IPCOM/000243492D; Sep. 24, 2015.
(Continued)

*Primary Examiner* — Bharat Barot
(74) *Attorney, Agent, or Firm* — Robert Shatto, Esq.; George S. Blasiak, Esq.; Heslin Rothenberg Farley & Mesiti P.C.

(57) ABSTRACT

Methods, computer program products, and systems are presented. The method computer program products, and systems can include, for instance: obtaining one or more data feed that includes data of individuals within a crowd, wherein the crowd comprises a plurality of individuals gathered within an area; examining data of the one or more data feed to return behavior parameter values for respective individuals of the plurality of individuals; identifying, using values of the behavior parameter values, a disrupted group of a plurality of the individuals of the crowd, wherein the identifying is in dependence on a first one or more criterion being satisfied; detecting, using values of the behavior parameter values, a disruptor individual within the disrupted group, the detecting in dependence on a second one or more criterion being satisfied; and providing, by machine logic, one more disruptor mitigation output to mitigate disruptive behavior of the disruptor individual.

20 Claims, 9 Drawing Sheets

(51) Int. Cl.
  *G06N 20/00* (2019.01)
  *H04L 12/58* (2006.01)
  *H04L 12/26* (2006.01)
  *H04L 29/08* (2006.01)
  *H04W 4/021* (2018.01)

(52) U.S. Cl.
  CPC ......... *G06N 20/00* (2019.01); *H04L 43/0876* (2013.01); *H04L 51/04* (2013.01); *H04L 51/32* (2013.01); *H04L 67/22* (2013.01); *H04W 4/021* (2013.01)

(58) Field of Classification Search
  USPC ................ 709/202–203, 206–207, 217–219
  See application file for complete search history.

(56) References Cited

U.S. PATENT DOCUMENTS

| | | | |
|---|---|---|---|
| 9,141,604 | B2 | 9/2015 | Thirumalainambi et al. |
| 10,165,023 | B2* | 12/2018 | Davar ................... H04L 67/02 |
| 2013/0182117 | A1* | 7/2013 | Arseneau ............. G06F 3/0482 |
| | | | 348/157 |
| 2013/0281798 | A1 | 10/2013 | Rau et al. |
| 2015/0348569 | A1 | 12/2015 | Allam et al. |
| 2016/0072900 | A1* | 3/2016 | Rahman ................ H04W 4/021 |
| | | | 709/213 |
| 2018/0082436 | A1* | 3/2018 | Hattori ..................... G06T 1/60 |
| 2020/0077243 | A1* | 3/2020 | Heller .................. H04W 4/021 |

OTHER PUBLICATIONS

Anonymously; "Social Data Analysis as Unobtrusive Measure for Validating Human Behavior Assessment or Test (Psychometric) Results";http://ip.com/IPCOM/000208050D;Jun. 21, 2011.

Anonymously; "Method and Apparatus for Customizable Composite Behavioral Recognition and Emotional States Mapping"; http://ip.com/IPCOM/000246323D; May 30, 2016.

Anonymously; "Cognitive Feedback Analysis to Proactively Trigger Automatic System Modifications and User Actions"; http://ip.com/IPCOM/000247630D; Sep. 21, 2016.

Mell et al., "The NIST Definition of Cloud Computing", National Institute of Standards and Technology, U.S. Dept. of Commerce, NIST Special Publ. 800-145, Sep. 2011, 7 pages.

* cited by examiner

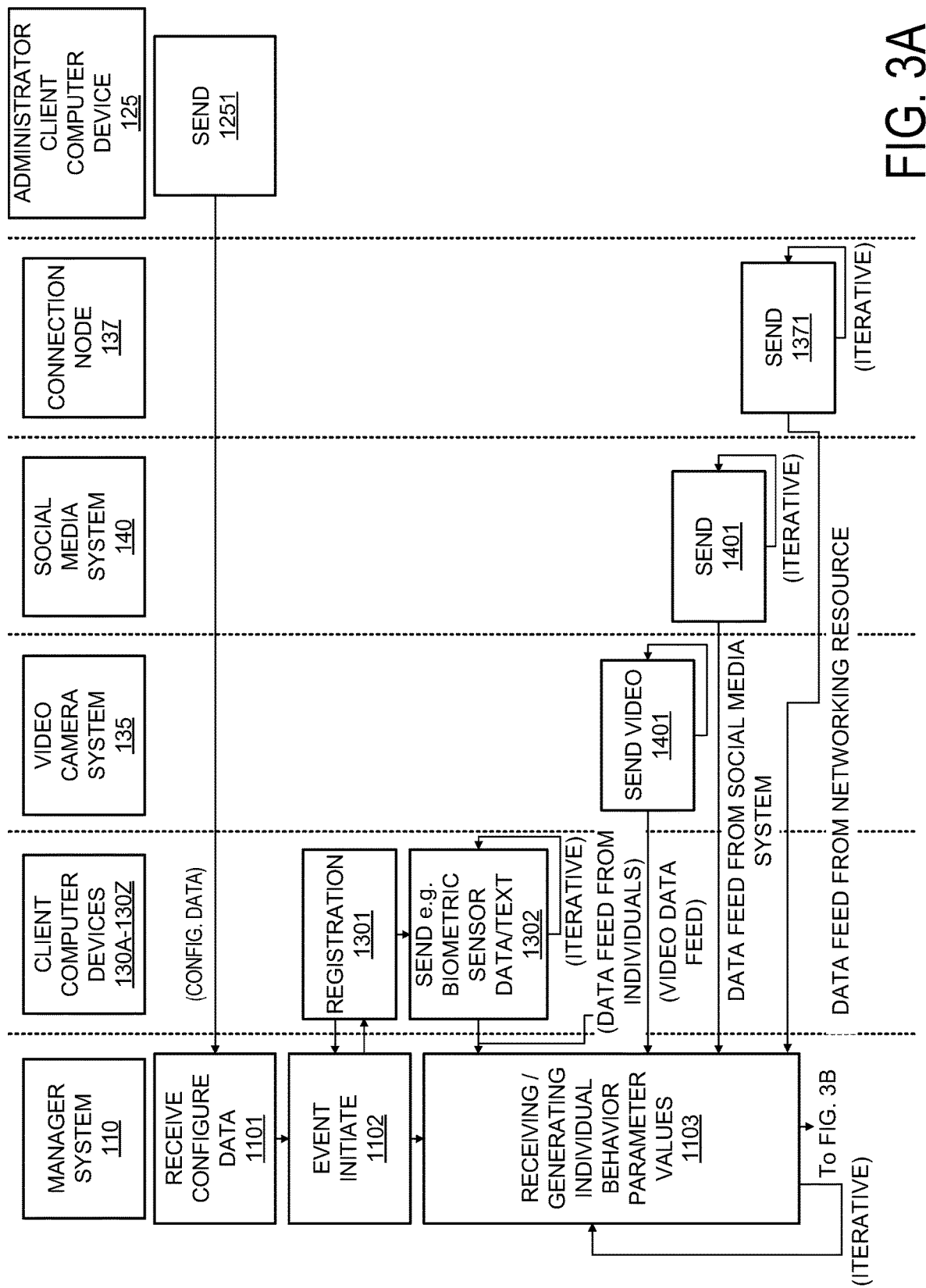

US 10,769,419 B2

DISRUPTOR MITIGATION

BACKGROUND

Location based services (LBS) are software services that use location data to control functionality of computer systems LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WI-FI based locating technologies, and other technologies. One example of an LBS is a location-based messaging service wherein notifications and other messages to users can be in dependence on the respective locations of the users.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

SUMMARY

Shortcomings of the prior art are overcome, and additional advantages are provided, through the provision, in one aspect, of a method. The method can include, for example: obtaining one or more data feed that includes data of individuals within a crowd, wherein the crowd comprises a plurality of individuals gathered within an area; examining data of the one or more data feed to return behavior parameter values for respective individuals of the plurality of individuals; identifying, using values of the behavior parameter values, a disrupted group of a plurality of the individuals of the crowd, wherein the identifying is in dependence on a first one or more criterion being satisfied; detecting, using values of the behavior parameter values, a disruptor individual within the disrupted group, the detecting in dependence on a second one or more criterion being satisfied; and providing, by machine logic, one more disruptor mitigation output to mitigate disruptive behavior of the disruptor individual.

In another aspect, a computer program product can be provided. The computer program product can include a computer readable storage medium readable by one or more processing circuit and storing instructions for execution by one or more processor for performing a method. The method can include, for example: obtaining one or more data feed that includes data of individuals within a crowd, wherein the crowd comprises a plurality of individuals gathered within an area; examining data of the one or more data feed to return behavior parameter values for respective individuals of the plurality of individuals; identifying, using values of the behavior parameter values, a disrupted group of a plurality of the individuals of the crowd, wherein the identifying is in dependence on a first one or more criterion being satisfied; detecting, using values of the behavior parameter values, a disruptor individual within the disrupted group, the detecting in dependence on a second one or more criterion being satisfied; and providing, by machine logic, one more disruptor mitigation output to mitigate disruptive behavior of the disruptor individual.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining one or more data feed that includes data of individuals within a crowd, wherein the crowd comprises a plurality of individuals gathered within an area; examining data of the one or more data feed to return behavior parameter values for respective individuals of the plurality of individuals; identifying, using values of the behavior parameter values, a disrupted group of a plurality of the individuals of the crowd, wherein the identifying is in dependence on a first one or more criterion being satisfied; detecting, using values of the behavior parameter values, a disruptor individual within the disrupted group, the detecting in dependence on a second one or more criterion being satisfied; and providing, by machine logic, one more disruptor mitigation output to mitigate disruptive behavior of the disruptor individual.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 3A-3B are a flowchart illustrating a method for performance by a manager system according to one embodiment;

DETAILED DESCRIPTION

Figure 1:
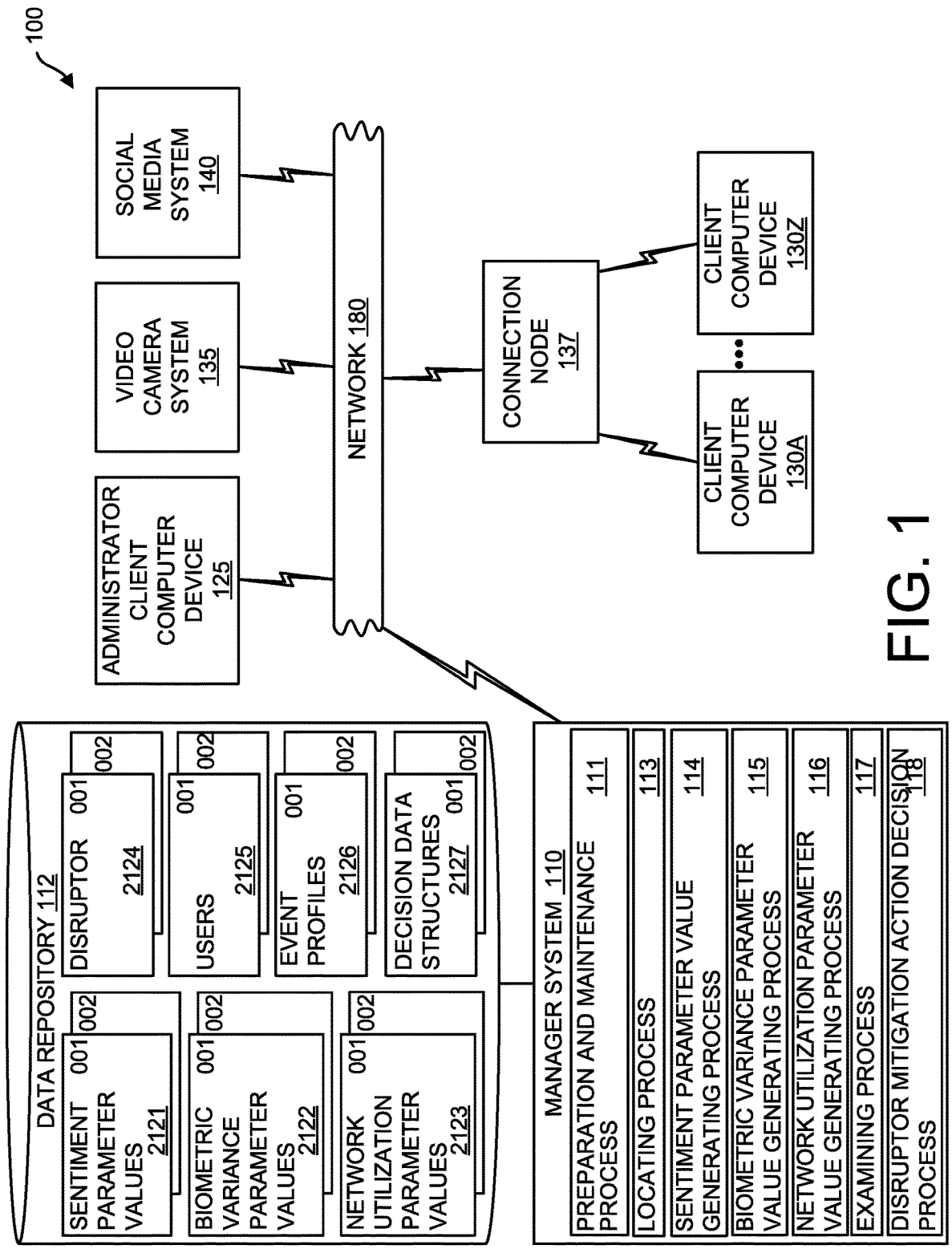
FIG. 1 depicts a system having a manager system, client computer devices, and an administrator client computer device, a video camera system, and social media system according to one embodiment.

FIG. 1 is a block diagram of system 100, in accordance with one embodiment as set forth herein. In the embodiment of FIG. 1, system 100 can include numerous devices such as computing node based devices connected by a network 180. Network 180 can be provided, e.g. a physical network and/or a virtual network. A physical network can be for example, a physical telecommunications network connecting numerous computing nodes or systems, such as computer servers and computer clients. A virtual network can for example, combine numerous physical networks or parts thereof into a logical virtual network. In another example, numerous virtual networks can be defined over a single virtual network.

By way of explanation, FIG. 1 depicts an example environment. In one embodiment, system 100 can include a manager system 110, having an associated data repository 112, administrator computer device 125, client computer devices 130A-130Z, video camera system 135 and social media system 140 connected via network 180.

Client computer devices 130A-130Z, can be computer devices used by users of system 100. Users of system 100 can be for example, members of a crowd, such as members of a crowd at an event, as set forth herein. Users of system 100 may also be non-members or non-participants of the crowd at the event, and they may or may not be viewing or otherwise following the event in real time or approximately real time. An event may be a gathering of numerous people at a defined physical area for one or more specified purposes. Client computer devices 130A-130Z can be client computers for use by users of system 100 who are present at the event and form the crowd. Client computer devices 130A-130Z may be registered with the system 100 and have associated registered users, as set forth herein, or may be unregistered client computer devices having associated unregistered users. The client computer devices 130A-130Z may, generally, be any portable device of an individual of the crowd, such as a mobile, wearable and/or embedded digital device(s). Client computer devices 130A-130Z may be any type of mobile and/or wearable device carried by an individual of the crowd having various sensor and data capturing and/or processing capability.

For example, client computer devices 130A-130Z may be a smartwatch with a computer operating system, a smart phone, a tablet computer, a laptop computer, a personal digital assistant (PDA), a video game console, any IoT device (internet of things device) or any one of a number of additional devices capable of being transported by an individual of the crowd and sending and/or receiving data with the system 100. The client computer devices 130A-130Z may be capable of executing an application configured to provide data to the system 100. In some embodiments, the client computer devices 130A-130Z are capable of receiving data or information from at least one input device or component and are configured to communicate with the system 100 using a network interface capable of wireless communication (e.g., through network 180 via one or more connection node 137, as described further below).

Administrator computer device 125 can be a computer device that is used by an administrator user of system 100 and of manager system 110. Administrator computer device 125 can be a client computer device for use by an administrator user and can be provided, e.g., by a smartphone, laptop, smartwatch, and/or PC.

Client computer devices 130A-130Z can be wireless computer devices that can be connected to network 180 by alternative radio communication protocols. For example, client computer devices 130A-130Z can connect to network 180 by one or more connection node 137. One or more connection nodes 137 can include connection nodes that facilitate connection to a cellular communication network or a wireless LAN (e.g. IEEE 802.11 network). One or more connection nodes 137 can be provided by IEEE 802.11 access points of a WIFI wireless network.

In one embodiment, each client computer device 130A-130Z can be associated to a certain user. In one embodiment, each user of system 100 is a registered or unregistered user of system 100.

Each of the different client computer devices 130A-130Z can be associated to a different user. Regarding one or more client computer device 130A-130Z, a computer device of one or more client computer device 130A-130Z in one embodiment can be a computing node device provided by a client computer, e.g. a mobile device, e.g. a smartphone or tablet, a laptop, a wearable client computer device e.g. smartwatch or PC that runs one or more program, e.g. including a web browser for opening and viewing web pages.

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment.

According to one embodiment, manager system 110 can be external one or more of connection node 137, client computer devices 130A-130Z, administrator client computer device 125, video camera system 135 and social media system. According to one embodiment, manager system 110 can be co-located with one or more of connection node 137, client computer devices 130A-130Z, administrator client computer device 125, video camera system 135 and social media system.

Manager system 110 can run various processes such as preparation and maintenance process 111, locating process 113, sentiment parameter value generating process, biometric variance parameter value generating process, network utilization level parameter value generating process 116, examining process 117, and disruptor mitigation action decision process 118.

Embodiments herein recognize that individuals gather together for many different reasons. Sporting events, concerts, speeches, fundraisers, religious ceremonies, festivals, parades, marches, classes and many other types of events or locations may include numerous people located in a relatively defined or restricted physical area. Unfortunately, one or more individuals within a crowd may disrupt the gathering, such as a disruption to the event itself that spawned the crowd and/or a disruption to the activity of the other individuals of the crowd. A disruptor may purposefully disrupt the event and/or crowd or inadvertently or unintentionally disrupt the event and/or crowd. Embodiments herein recognize that detection of a disruptor in a crowd may facilitate removal or suppression of the disruptor from the crowd, as well as prevention or de-escalation of the disruptor's disruptive behavior. Detections of a disruptor in a crowd, and prevention or elimination of the disruptor's disruptive behavior, is thereby desirable.

Data repository 112 can store various data. Data repository 112 in sentiment parameter values area 2121 can store data on determined sentiment parameter values for individuals within a group defining a crowd located within an area. Sentiment parameter values area 2121 can include sentiment parameter values determined using one or more data feed such as a video feed as received from video camera system 135, a text based feed as received from social media system 140, and/or data feed of client computer devices 130A to 130Z. The data feed from client computer devices 130A to 130Z can include text based data, e.g., where a client computer device participates in a messaging system, e.g., which can be mediated by social media system 140 or another messaging system. Manager system 110 can process video feed data or text based data, e.g., as received from social media system 140 and/or client computer devices 130A to 130Z for return of one or more sentiment parameter value for respective individuals defining a group within an area. In one embodiment, system 100 can be configured to support one or more video feeds, natural language content feeds and biometric data feeds of the crowd. For providing and analyzing the video feed, system 100 can be configured to operate in accordance with the Real-time Transport Protocol (RTP), which is set forth in Requests for Comments (RFC) 3550, published by the Internet Engineering Taskforce (IETF) and the Internet Society (ISOC).

Sentiment parameters can include, e.g., polar sentiment parameters, such as positive or negative, or non-polar sentiment parameters, e.g., anger, disgust, fear, sadness and/or joy. The value that is associated to a sentiment parameter can be regarding to be a level of confidence on a scale of zero to one. For example, the parameter value data set of positive/negative is >0.9 can specify a 90% level of confidence that analyzed content has a negative sentiment, e.g., as might be determined when a participant is grimacing. In the case of a non-polar sentiment, a parameter value data set of, e.g., anger=0.85 can specify an 85% level of confidence that the sentiment associated with analyzed data is "angry", e.g., as might be determined in the case that a participant is grimacing.

Data repository 112 in biometric variance parameter values area 2122 can store biometric variance parameter values for respective individuals defining a group within an area. Manager system 110 determining the biometric variance parameter value for an individual can receive and process biometric sensor output data for the individual which can be output by a biometric sensor that is associated to a certain individual, e.g., which can be worn by an individual. Embodiments herein recognize that a client computer device of client computer devices 130A to 130Z associated to an individual according to one embodiment can be provided by a worn client computer device such as a smartwatch that has one or more integrated biometric sensors for sensing biometric data of an individual that wears the smartwatch and which incorporates one or more biometric sensor. A biometric sensor associated to an individual and worn by an individual can include, e.g., a pulmonary sensor, such as a pulse rate sensor, a heart rate sensor or blood pressure sensor. A biometric sensor herein can also include, e.g., a respiratory sensor or a skin conductance sensor. Manager system 110 for determining a biometric variance parameter value for an individual can determine the baseline parameter value for an individual user and can determine a biometric variance parameter using the baseline value. Baseline value herein can be, e.g., an average or median value of a parameter value for an individual user over a specified period of time and manager system 110 can return a biometric variance parameter value based on the difference between a currently-returned parameter value for a biometric parameter and the baseline value for the biometric parameter. Manager system 110 can return biometric variance parameter values, according to one embodiment, on a scale of zero (0.0) to 1.0, with values tending toward 1.0 indicating a higher degree of variance from a baseline value, and with values tending towards 0.0 indicating a lower degree of variance from a baseline value.

Data repository 112 in network utilization level parameter values area 2123 can store data on network usage by individuals defining a crowd within an area. Individuals defining a crowd can be associated to one or more client computer devices 130A to 130Z. Manager system 110 can track network utilization levels of individuals associated to client computer devices 130A to 130Z. By monitoring data received from a network resource, e.g., one or more connection node 137. Where user individuals of client computer devices 130A to 130Z are registered users of system 100, data packets transmitted by client computer devices 130A to 130Z through one or more connection node 137 can have metadata that specifies registered user IDs. In such a user case, manager system 110 can examine user ID metadata to associate network utilization level values to appropriate users in network utilization parameter values area 2123. Alternatively, using network based locating methodologies, system 100 can associate locations within an area to individuals associated with such locations and network utilization level to such locations. Manager system 110 can return the network utilization level parameter values on a scale of 0.0 to 1.0, with data values tending towards zero (0.0) indicating low or no network utilization level utilization and data values tending towards 1.0 indicating high network utilization level utilization. In a user case where users are unregistered users having client computer devices that do not send data packets having registered user ID tagged data, manager system 110 can nevertheless accurately track network utilization levels for such unregistered users for storage of accurate data into network utilization parameter values area 2123. For example, manager system 110 can subject video data of video camera system 135 to facial recognition processing to return an unregistered user and can cross reference the unregistered user ID to a location of client computer device of the unregistered user as reported by locating process 113.

Data repository 112 and disruptors area 2124 can store historical data on disruptor users of system 100 that have been determined by system 100 to be disruptors. Data of disruptors area 2124 can include, e.g., identifiers for users determined to be disruptors, mitigation actions associated with prior disruptor events, performance data indicating performance of prior disruptor mitigation events, and facial images associated with disruptors determined through the history of deployment of system. Manager system 110 can iteratively scan postings of recorded disruptor users in social media system 140 and can subject such postings to Natural Language Processing (NLP) to return preference topics e.g. special interest of disruptor users regarding e.g. preferences such as habits, hobbies, interests, and areas of expertise of the disruptor users having profiles specified by data stored within disruptors area 2124. Manager system 110 can then examine disruptor preferences as recorded in disruptors area for determination of text based messages to send to a disruptor for mitigation of disruptive activity.

Data repository 112 in users area 2125 can store data on users of system 100. Users identified within users area 2125 can include, e.g., registered users and unregistered users. In some instances, registration of users within system 100 can facilitate simplified access data for use by system 100, e.g., registration according to one embodiment can return a grant of access rights to data of social media system 140 so that manager system 110 can examine a data feed comprising data from social media system 140, e.g., text based postings of users who have registered within system 100. Users area 2125 can also include data on unregistered users of system 100, e.g., can include assigned identifiers to individuals who have been observed by system 100.

For example, manager system 110 based on data received from video camera system 135 can observe a new unregistered user of system 100, e.g., an individual who attends a first crowd event and can store within users area 2125 a profile of such user, which can include, e.g., facial image data for the new user. Use of the stored facial image data during a next crowd event attended by the user, manager system 110 can recognize the user as a previously-observed user and add to the profile of such user a record item indicating that the user has been recognized at the second crowd event. Data repository 112 in users area 2125 can store profiles data for both registered users and unregistered users. Manager system 110 can assign user IDs to users of system 100 and data stored within users area 2125 can be associated to the assignee user IDs assigned by manager system 110. Manager system 110 can assign unregistered user IDs to unregistered users of system 100. Manager system 110 can assign examined media access control (MAC) addresses of client computer devices 130A-130Z as unregistered user IDs for unregistered users of system 100. One or more connection node 137 can report examined MAC addresses of client computer devices 130A-130Z examined by one or more connection node for use in tracking data and storing user associated data into areas of data repository 112.

Data repository 112 in users area 2125 can include historical data on locations visited by users of system 100. As users move throughout an environment their movement can be traced and logged into users area 2125. In one embodiment, users area 2125 can include a table associating users within their respective locations (e.g. given in coordinates) and each location can be associated with a timestamp. Locating services can be e.g. control plane based, self-reported based, local range based or a combination of the noted types. In one embodiment, locating services provided by system 100 can locate a computer device of client computer devices 130A-130Z using e.g. GPS based locating services, locating services based on processing of signals received by one or more connection node 137 (cellular network based or wireless LAN (e.g. WIFI based)), or a combination of such services.

Sentiment parameter values area 2121, biometric variance parameter values area 2122, and network utilization level parameters values area 2123 can store parameter values that are associated to respective users of system 100, e.g., can be associated to an identifier of a registered user of system or an identifier of an unregistered user of system 100 that has been assigned by manager system 110.

Data repository 112 in crowd event profiles area 2126 can store data on historical crowd events that have been serviced by manager system 110 for disruptor mitigation.

Data repository 112 in decision data structures area 2127 can store decision data structures for use in return of decision of data decisions provided by system 100, e.g., including decisions to return an action specifier that is associated to an identification of a destructor within a group of users.

Manager system 110 can run various processes. Manager system 110 can run preparation and maintenance process 111, locating process 113, sentiment parameter value generating process 114, biometric variance parameter value generating process 115, network utilization level parameter value generating process 116, examining process 117 and disruptor mitigation action decision process 118.

Manager system 110 running preparation and maintenance process 111 can include manager system 110 receiving data from various data sources and processing such data for storage into different areas of data repository 112 such as areas 2121 to 2126 as set forth herein.

Manager system 110 running locating process 113 can include manager system 110 recording and tracking locations of users defining a crowd within an area. Manager system 110 can track locations of users with use of various methodologies. Manager system 110 can employ, e.g., network-based locating technologies for tracking of locations of users using radio signal data collected by one or more connection node 137.

Further, respective users of system 100 can report their respective locations to manager system 110 with use of location sensors of such devices, e.g., GPS sensors of respective client computer devices 130A to 130Z so that users area 2125 can store for each user, over time, a current location of the user. Location determination of users can also be provided with use of data provided by video camera system 135. Video camera system 135 can be at fixed locations and vantage points such that pixel locations of video frames can be associated to coordinate locations of an area where a crowd is located. In some embodiments, video camera system 135 can include one or more 3D camera that reports coordinate spatial locations of objects in a field of view. In such embodiments, locating of users can be performed entirely by processing of data obtained from video camera system 135.

Manager system 110 running sentiment parameter value generating process 114 can generate sentiment parameter values for users to define individuals of a crowd for storage and to biometric variance parameter values area 2122 for storage into sentiment parameter value areas 2121. Manager system 110 running sentiment parameter generating process 114 can analyze, e.g., video feed data is received from video camera system 135 or can examine text data, e.g., as can be received from social media system 140, e.g., in the form of text based posts by users, or text based data can be received in a data feed from client computer devices 130A to 130Z associated to user individuals who define a crowd, e.g., where such user individuals are engaged in text based messaging during a crowd event.

Data repository 112 can include in crowd event profiles area 2126 data on historical crowd events that have been serviced by manager system 110. Crowd events can include, e.g., entertainment events, such as sporting events, theater events, live music events, worship events, or educational crowd events as in a classroom or school auditorium setting.

Manager system 110 running sentiment parameter value generating process 114 can include manager system processing facial feature representing video data as received from video camera system 135. Such processing can employ commercial software, e.g., EMOTION VIDEO ANALYTICS™ software by nVISO™ of Lausanne, Switzerland available on IBM SmartCloud® services (IBM SmartCloud® is a registered trademark of International Business Machines Corporation. Video-based sentiment analysis can return various sentiment parameters including, e.g., anger, disgust, fear, sadness and/or joy. Video-processing sentiment analysis can return parameter values in the form of confidence levels, e.g., for the sentiment parameter anger, sentiment parameter value of 0.85 indicates an 85% level of confidence that a current sentiment is anger. Video processing sentiment analysis can also return polar sentiment parameters, e.g., the parameters of "positive sentiment" or "negative sentiment". Manager system 110 performing a text based sentiment analysis can also return and include manager system 110 running a natural language processing (NLP process).

Manager system 110 can run an NLP process to process data for preparation of records that are stored in data repository 112 and for other purposes. Manager system 110 can run a Natural Language Processing (NLP) process for determining one or more NLP output parameter of a message. NLP process can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of an NLP process manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Manager system 110 running biometric variance parameter value generating process 115 can include manager system 110 processing output data of biometric sensors that are associated to respective users of system 100, which users can be users of client computer devices 130A to 130Z, which can include, according to one embodiment, biometric sensors integrated into client computer devices 130A to 130Z associated to a user. According to one embodiment, a client computer device of a user can include an integrated biometric sensor that is physically associated to a user, e.g., by being worn or being carried by the user. One example of a biometric sensor that can be incorporated in a client computer device is a pulmonary sensor, e.g., a heartrate sensor, blood pressure sensor, and/or blood oxygen level sensor. According to one embodiment, a client computer device associated to a user of a system which can be a client computer device of client computer devices 130A to 130Z can be provided by a smartphone that is carried by a user or a smartwatch that is worn by a user. In either case, the client computer device having one or more integrated biometric sensors can iteratively report biometric data for processing by manager system 110 for the return of biometric variance parameter values that can be stored in biometric variance parameter values area 2122. Heartrate biometrics sensors for heartrate detection integrated into a client computer device 130A-130Z provided by a wearable client computer device can include e.g. an electrocardiography (ECG) sensor, photoplethysmogram (PPG) sensor bioelectrical impedance analysis (BIA) sensor.

Manager system 110 running network utilization parameter value generating process 116 can return parameter values indicating a level of network usage by client computer devices 130A-130Z. Manager system 110 network utilization level parameter value generating process 116 can run IT management system software to record network data usage data of client computer devices 130A-130Z. Manager system 110 can store data on network usage of users of system 100 in network utilization level parameter values area 2123. Client computer devices can send data packets having user ID metadata as specified as registered user identifiers so that bandwidth utilization by registered users can be tracked by manager system 110 and associated by manager system 110 to registered user identifiers of users area 2125.

Manager system 110 running examining process 117 can include manager system 110 examination of data feed data for return of an identification of a disrupted group within an area in which a crowd is formed and/or for detection of a disruptor within a disrupted group such as a disruptor located within a disrupted region within an area in which a crowd is gathered.

Manager system 110 running disruptor mitigation action decision process 118 can return action decisions in response to an identification of a disruptor within group of users located within a region. Manager system 110 running disruptor mitigation action decision process 118 can use a decision data structure stored in decision data structures area 2127 such as a decision data structure that cognitively maps a methodology used for determination of one or more or the disrupted group or the disruptor individual to specified one or more action associated to the methodology, and wherein the method includes using predictive model trained by machine learning for updating the decision data structure.

User behavior parameter values such as sentiment parameter values, biometric variance parameter values, and network utilization level parameter values stored in respective areas 2121, 2122 and 2123 of data repository 112 can be associated to user identifiers such as registered user identifiers or unregistered user identifiers. Such user behavior parameter values can also be timestamped so that a time of a parameter value is stored in data repository 112 and can also be geo-stamped so that user behavior parameter values are associated to locations of the respective users at the time of generation of the behavior parameter values which can be generated in real time by manager system 110 on receipt of data from one or more data source. Geo-stamping can be performed based on output data provided by locating process 113 which can track locations of respective users of system 100 and record such locations over time by time-stamping and to user area 2125 of data repository 112.

Figure 2:
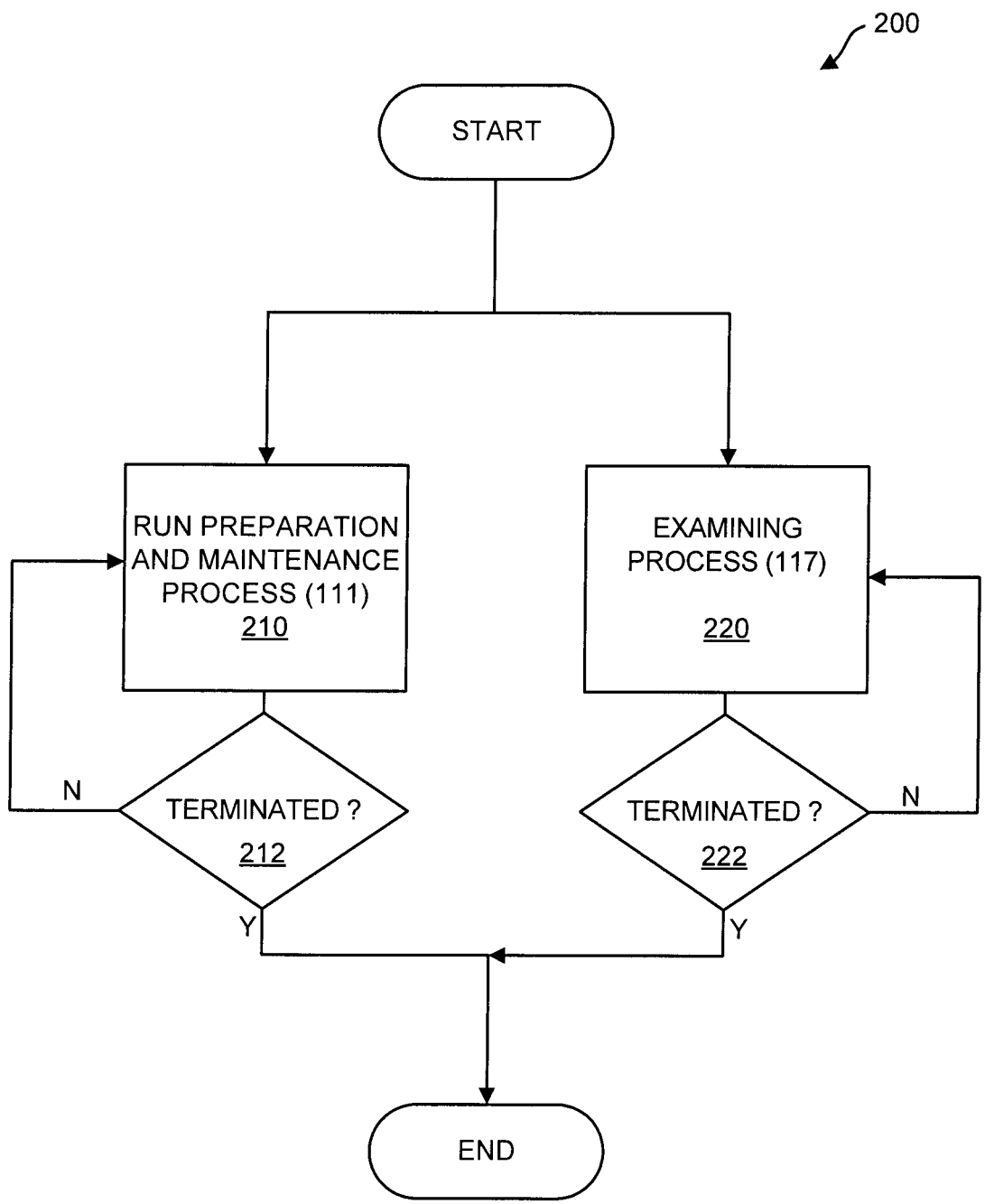
FIG. 2 is a flowchart illustrating a method for performance by a manager system according to one embodiment.

FIG. 2 is a flowchart illustrating a method 200 that can be performed by manager system 110. At block 210 manager system 110 can run preparation and maintenance process 111, e.g. to populate, prepare, and/or maintain various data of data repository 112 such as data of areas 2121-2127. For performance of preparation and maintenance process 111 manager system 110 can be configured to automatically process data inputs received data sources of system 100 such as client computer devices 130A-130Z, one or more connection node 137, video camera system 135 and/or social media system 140. Manager system 110 can run preparation and maintenance process 111 iteratively until preparation and maintenance process 111 is terminated at block 212. At block 220, manager system 110 can run examining process 117. A plurality of instances of examining process 117 can be simultaneously run. Manger system 110 can run examining process 117 until examining process 117 is terminated at block 222. With the performing of examining process 115 iteratively, manager system 110 can be iteratively running associated processes iteratively such as processes 113-116 and process 118.

Figure 3B:
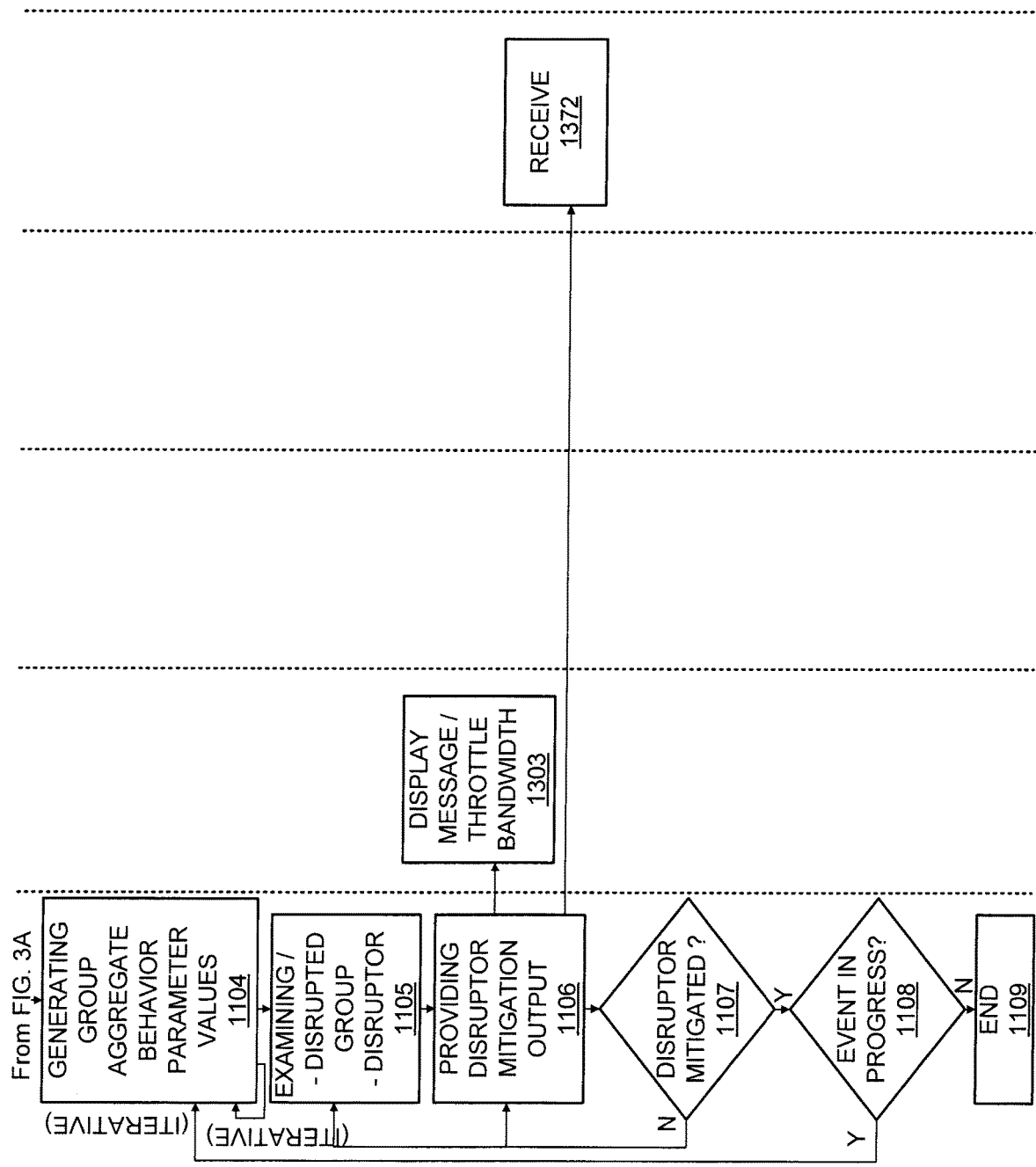

FIGS. 3A-3B is flowchart illustrating a method that can be performed by manager system 110 interoperating with client computer devices 130A-130Z, video camera system 135, social media system 140, connection node 137, and administrator client computer device 125.

Referring to the flowchart of FIGS. 3A-3B, manager system 110 at block 1101 can receive configuration data from administrator client computer device 125. Administrator client computer device 125 can include a user interface that allows an administrator user to device configuration selections, e.g. defining decision data structures for use in returning action decisions, and numerous other configuration selections. Administrator client computer device 125 at block 1251 can send administrator defined configuration data to manager system 110 for receipt by manager system 110 at block 1101.

Manager system 110 at block 1102 can initiate an event, e.g. a crowd event. Crowd events can include, e.g., entertainment events, such as sporting events, theater events, live music events, worship events, or educational crowd events as in a classroom or school auditorium setting. For initiating an event manager system 110 can receive registration data from individuals within an area of an event. Client computer devices of client computer devices 130A-130Z can send registration data for registering for an event at registration block 1301 for receipt by manager system 110 at block 1102. Users (individuals) within an area of an event can include registered users and/or unregistered data. Data for each type of user can be stored in users area 2125 as set forth herein. Where a user is a registered user, manager system 110 can perform alternative processes for obtaining and examining data of a user. For example, with registration, manager system 110 can have permission tom scan postings data of user posted into social media system 140. Users of system 100 may be inclined to register as registered users of system 110 based on receipt of enhances services at an event such as services for disruptor mitigation as set forth herein.

Referring to the flowchart of FIGS. 3A-B, manager system 110 at block 1103, can be receiving various data from various data sources that define different data feeds. Manager system 110 at block 1103 can be receiving data feed from video camera system 135 provided by video feed. Video camera 135 and include, e.g., one or more video camera fixedly mounted on infrastructure of a venue associated to an area at which a crowd is formed. Video camera system 135 at block 1401 can be iteratively sending video data for receipt and processing by manager system 110 at block 1103.

Manager system 110 at block 1103 can be receiving data of a data feed provided by client computer devices 130A-130Z which can be, e.g., handheld smart phone and/or smart watch client computer devices. Client computer devices 130A-130Z at block 1302 can be iteratively sending data, e.g., biometric sensor data and text data for receipt by manager system 110 at block 1103. Data provided by client computer devices 130A-130Z can include, e.g., biometric sensor data provided by one or more biometric sensor integrally disposed within a client computer device of respective client computer devices 130A-130Z of users of system 100. Data of a data feed provided by client computer devices 130A-130Z can also include, e.g., text based data defining messages defined by users using their respective client computer device while engaging in messaging with user's internal or external to an area at which crowd is formed.

At block 1103 manager system 110 can also be receiving a data feed from social media system 140. At block 1401 social media system 140 can be iteratively sending, e.g., in response to a pull request, data such as post-content data of users of system 100. Manager system 110 can be configured so that when a registered user enters an area of a crowd event, manager system 110 scans text based data of the user that is being posted on social media system 140 during a crowd event. Such data can then be processed by manager system 110 to determine the sentiment of a user during the crowd event as set forth the more detail herein.

Manager system 110 at block 1103 can also be receiving data from a data source provided by one or more network resource. For example, one or more connection node 137 at block 1371 can be iteratively sending network utilization level data to manager system 110 for receipt and processing by manager system 110 at block 1103. The network utilization level data can include data respecting bandwidth consumption for a current time segment for each of a plurality of locations of an area where in each of the plurality of locations is associated to user, e.g., specifies the location of one user. Manager system 110 can process such data received by the data feed provided by connection node by one or more connection node 137 for maintaining a running track of network utilization levels of all of respective users of system 100 within an area of a crowd event. Manager system 110 at block 1103 can perform generating individual behavior parameter values for respective users of system 100 within an area of a crowd event. Manager system 110 at block 1103 can, for example, activate sentiment parameter value generating process 114 to generate sentiment parameter values for respective users of system located within an area of a crowd event.

Manager system 110 can activate biometric variance parameter value generating process 115 to generate biometric variance parameter values for respective users located and within an area of a crowd event and/or can activate examining process and/or can activate network utilization parameter value generating process 116 to generate for respective users within an area of a crowd event network utilization level parameter values over time for respective users within an area of a crowd event.

Manager system 110 can iteratively generate receiving of a data from the various data sources described and generating individual behavior parameter values based on data of the data feeds and an iterative basis and at each iteration can timestamp the return behavior parameter values and can geo-stamp the generated individual behavior parameter values on an iterative basis so that data repository 112 in sentiment parameter values area 2121, biometric variance parameter values area 2122, network utilization parameter values area 2123 stores timestamped, geo-stamped, and user ID stamped (registered or unregistered) data values.

Data repository 112 thus stores a historical record of behavior parameter values of respective users of system over time during a current crowd event and for historical crowd events serviced by manager system 110. Manager system 110 at block 1104 and performed generating group behavior parameter values.

At block 1104, manager system 110 can generate group aggregate behavior parameter values indicative of behavior of a group of individuals, e.g., a group of individuals within an area in which a crowd event is formed or a sub area of such area referred to herein as a region. For generating a group aggregate behavior parameter value (e.g. sentiment based, biometric variance based, and/or network utilization level based) manager system 110 at block 1104 can generate a group aggregate behavior parameter value indicative of behavior of a plurality of individuals within a space, e.g. an area or a region. Manager system 110 returning a group aggregate parameter value for a space, e.g., an area or region can include according to one embodiment manager system 110 averaging behavior parameter values for individual users throughout the area.

For generating a group aggregate parameter value according to one embodiment, the entirety data set values for a certain behavior parameter within a data set for a space need not be utilized but rather the calculation of an aggregate parameter value can be based on sampling data, e.g., generally evenly distributed locations throughout a space in which a crowd is located. According to one embodiment, manager system 110 can return an aggregate behavior parameter value based on a calculation of median values rather than mean values.

According to one embodiment, a calculation of an aggregate behavior parameter value can include application of one or more certain filter such as a filter for removal of a highest threshold percent and a lowest threshold percent of data values prior to performance of a calculation for return of a group aggregate behavior parameter value.

Manager system 110 at block 1105 can activate examining process 117. Manager system 110 running examining process 117 can include manager system 110 examination of data feed data for return of an identification of a disrupted group within an area in which a crowd is formed and/or for detection of a disruptor within an identified disrupted group such as a disruptor located within a disrupted region within a crowd, wherein the crowd can be formed within an area.

According to some use case scenarios, e.g., where a crowd is sufficiently small, manager system 110 at block 1105 may not perform identification of a disrupted group but can perform detection of a disruptor within a group wherein the disrupted group us taken as the entirety of a crowd and not a region within an area in which the crowd is formed.

Manager system 110 performing examining at block 1105 can include manager system 110 applying one or more criterion for disrupted group identification and/or one or more criterion for return of a detection of a disruptor individual within an identified disrupted group of individuals. Performance of examining at block 1105 is described further in reference to the illustrative examples, examples one to five below.

Figure 4:
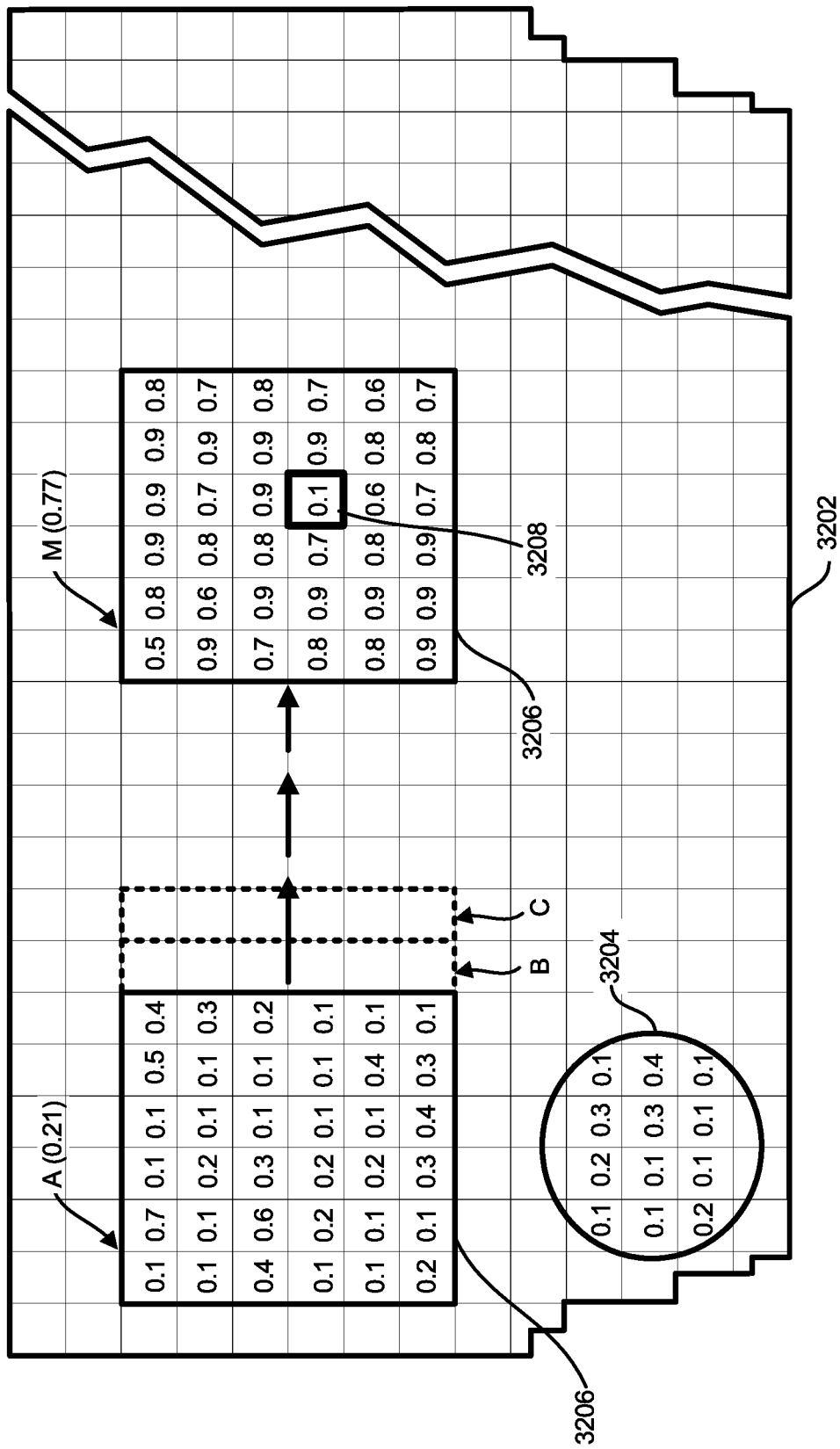
FIG. 4 depicts an area subject to sliding window processing for identification of a disrupted group and/or for detection of a disruptor individual according to one embodiment.

An illustrative example of manager system 110 identifying a disrupted group and disrupted region within an area and further determining a disrupter individual within the disrupted group and region, is set forth in reference to FIG. 4.

Example 1

Area 3202 depicts a spatial area that can include individuals defining a crowd. The crowd within area 3202 can include, e.g. a crowd within an entertainment venue such as a sports stadium. Each cell within area 3202 can represent one spatial location in which one individual defining the crowd is located. As set forth herein, manager system 110 can process video feed data for return for each individual one or more sentiment parameter value. Sentiment parameters can include, e.g. polar sentiment parameter values such as "positive" or "negative" or nonpolar sentiment parameter values, e.g. "anger", "disgust", "fear", "sadness", and/or "joy." The value that is associated to a sentiment parameter can be regarded to be a level of confidence on a scale of 0 to 1. For example, the parameter value dataset of: positive/negative 0.9 can specify a 90% level of confidence that the analyzed content has a negative sentiment, e.g. as might be determined when a participant is grimacing. In the case of a nonpolar sentiment, a parameter value dataset of: anger=0.85 can specify an 85% level of confidence that the sentiment associated with sample video data is "angry," e.g. as might be determined in the case that the participant is grimacing.

Referring to FIG. 4, sentiment analysis performed by manager system 110 can include sliding window analysis. Each cell or location within area 3202 can be associated to an individual and accordingly can be associated to one or more sentiment parameter value that is determined for the individual. According to one embodiment, sentiment analysis for identification of a disrupted group within a disrupted region can include analysis of "anger" sentiment parameter values. Embodiments herein recognize that individuals located in proximity to a disrupter can be expected to have higher anger sentiment parameter values than individuals away from a disrupter individual who are enjoying an entertainment event ongoing at a venue that includes area 3202. In FIG. 4, each cell within area 3202 can include an "anger" sentiment value representative ones of which are specified in FIG. 4. In sample region 3204 there are depicted representative "anger" sentiment parameter values. Within sliding window 3206 at representative sliding window locations A and P there are also specified representative "anger" sentiment parameter values each value associated to a different individual within a crowd.

Manager system 110 performing sentiment analysis to identify a disrupted group within a disrupted region can include processing as set forth in FIG. 4. Manager system 110 can iteratively move sliding window 3206 through subareas of area 3202. Sliding window 3206 can include a fixed number of cells (which are spatial area subunits of area 3202). In practice it will be understood that sliding window 3206 can encompass a different number of individuals at each location depending upon the particular distribution of individuals within a crowd. As referenced in FIG. 4, manager system 110 can advance sliding window 3206 from location A to location B, to location C, and so on, until location M as indicated in FIG. 4 in arrived at. For each window location, manager system 110 can compare a group aggregate sentiment value for a region at the current window location to a group aggregate sentiment value for area 3202, e.g. the entire crowd.

Manager system 110 returning a group aggregate sentiment value for a space (e.g. an area or a region) can include according to one embodiment manager system 110 averaging each sentiment value for a certain sentiment parameter, e.g. "anger" throughout the area. According to one embodiment, the entirety of sentiment parameter values within a dataset need not be utilized, but rather the calculation of a group aggregate sentiment value can be based on a sampling of data, e.g. at generally, evenly distributed locations throughout area 3202. According to one embodiment, manager system 110 can return a group aggregate sentiment value based on a calculation of median values rather than mean values. According to one embodiment, a calculation of an aggregate sentiment value can include application of certain filters such as removal of a highest threshold percent and a lowest threshold percent of data values prior to performance of a calculation for return of an aggregate sentiment value. Manager system 110 for identification of a disrupted group within a disrupted region can for each location of sliding window 3206 return a group aggregate sentiment value for the region to a group aggregate sentiment value for area 3202.

Referring to window location A, manager system 110 according to one embodiment can return the group aggregate sentiment for the region defined by sliding window 3206 at location A as the value 0.21 and at location M can return the group aggregate sentiment value for the region of window 3206 at location B as the sentiment parameter value 0.77. According to one criterion for identification of a disrupted group within a disrupted region, manager system 110 can ascertain whether a difference between a group aggregate sentiment value for area 3202 and a group aggregate sentiment value for region exceeds a difference threshold, e.g. a difference threshold of 0.5. At location A the difference threshold between an area group aggregate sentiment value and a region group aggregate sentiment value is Diff=0.21−0.19=0.02 and less than the applicable difference threshold. Manager system 110 can perform the same test throughout the window locations B, C, D, etc. and at location P can determine that the difference value (Diff=0.77−0.19=0.58) exceeds the defined difference threshold of 0.5. Accordingly, manager system 110 in the described example using sliding window processing described can identify the candidate region of sliding window 3206 at location P to be a disrupted region encompassing a disrupted group of individuals.

With further reference to FIG. 4, manager system 110 can further determine that the candidate individual at location 3208 is a disrupter individual within a disrupted region. According to one embodiment, manager system 110 can examine each cell within an identified disrupted region, e.g. the sliding window at location M to processing to determine whether an individual associated to the cell qualifies as a disrupter.

According to the described example, threshold processing can be applied again. Manager system 110 according to one embodiment can determine that a candidate disrupter is a disrupter individual based on a sentiment value associated to the individual exceeding a difference threshold, e.g. a threshold difference value of 0.5. According to one rules-based criterion that can be applied, manager system 110 for each cell within an identified disrupted region, e.g. location M, can determine whether according to one embodiment the difference threshold can be selected to be 0.5. Accordingly, for each cell within the region at location M, manager system 110 can compare the regions group aggregate sentiment value 0.77 to the sentiment value associated to the cell and also associated to the individual, to ascertain whether the difference threshold is exceeded. For the cell and individual at location 3208, the sentiment value is 0.1 and the difference value of 0.77−0.1=0.67 exceeds a difference threshold value of 0.5. Accordingly, manager system 110 based on the applied one or more criterion applied can determine that the individual at location 3208 is a disrupting individual according to the described example. It will be understood that numerous alternative criterion can be applied for identification of a disrupted region within an area and for determining a disrupter individual within a disrupted region.

Embodiments herein recognize that where a disrupted region is identified based on having a threshold exceeding group aggregate anger parameter value, manager system 110 can identify a disruptor individual on the basis of a candidate disruptor having a sufficiently low anger sentiment parameter value. Embodiments herein recognize that a disruptor may be experiencing a low level of anger, or may even be experiencing joy.

Embodiments herein recognize that where a disrupted region is identified based on having a threshold exceeding group aggregate anger parameter value, a disruptor may also be exhibiting a high level of anger like most of the disrupted group. For example, a disruptor individual may have become angry, and have commenced "rant" to incite anger in others.

Embodiments herein recognize that manager system 110 in such a scenario can identify a disruptor individual on the basis of a candidate disruptor having exhibited a threshold exceeding anger sentiment parameter value for a longest period of time out of any individual within an identified disrupted region M. That is while FIG. 4 depicts a disruptor at location 3208 having a relatively low anger sentiment parameter value, the disruptor at location 3208 can alternatively have a relatively high anger sentiment parameter value and can be detected for threshold exceeding anger sentiment parameter value.

Manager system 110 detecting a disruptor individual within a disrupted group located within a disrupted region can include manager system 110 performing lookback processing using historical data of data repository 112 to detect an individual within a disrupted region M who has exhibited a threshold exceeding anger sentiment parameter value for a longest time period out of the respective individuals within region M. For example, manager system 110 with reference to fictitious example data can examine biometric variance parameter values for time T=t0, the current time, and can record that 5 individuals have and anger sentiment value above a selected high threshold. Manager system 110 can then examine data at historical time periods T=t−1, T=t−2, T=t−3 and so on which have occurred in the recent historical past, at interval time periods (e.g. 5 min. time periods in past) from the current time. Manager system 110 can detect a disruptor on the basis of the disruptor exhibiting the above threshold exceeding anger sentiment parameter value for the longest period of time among individuals within the identified disrupted region M.

In the use case depicted in FIG. 4, a disrupting individual can be determined based on having an "anger" sentiment parameter value that is lower than a group aggregate sentiment value by more than a threshold difference value. However, other criterion can be applied. For example, "anger" sentiment analysis can be applied for identification of a disrupted region within an area but determining a disrupter within an identified disrupted region can include analysis of sentiment parameters other than "anger" sentiment parameters, e.g. can encompass analysis of a "joy" parameter. According to one embodiment, based on the recognition that a disrupter individual can be exhibiting a threshold exceeding joy sentiment value while other individuals in the disrupter's vicinity can be exhibiting a threshold exceeding "anger" sentiment value. In the embodiment depicted in reference to FIG. 4, a disrupter individual within the region at location P can be identified based on the individual exhibiting a low "anger" sentiment value while others in the disrupter's vicinity are exhibiting high "anger" parameter values.

According to one embodiment, the sentiment parameter values depicted in FIG. 4 can represent positive/negative polarity sentiment parameter values rather than "anger" sentiment parameter values. In other words, the sentiment parameter values specified in FIG. 4 can represent levels of confidence (between 0 and 1) that the sentiment being exhibited is negative, e.g. which might be accompanied by a facial expression characterized by grimacing.

End of Example 1

Another example, Example 2, is described also in reference to FIG. 4 illustrating area 3202 in which a crowd is formed and sliding window processing in which sliding window 3206 is moved between different regions of area 3202 such as the succession of regions A-M as depicted in FIG. 4.

Example 2

According to example 2, the respective parameter values as shown in FIG. 4 at various user locations are not anger sentiment parameter values but rather are polar negative sentiment parameter values wherein negative sentiment parameter values are provided on a scale of zero to one wherein values tending towards one indicate a higher degree of confidence that a sentiment is negative.

It is seen with reference to Example 2 that the sliding window processing described in reference to FIG. 4 can be used for return of an identification of a disrupted group and region, as well as return of a detection of a disrupter within the disruptor group. Embodiments herein recognize that for many types of crowd events, e.g., entertainment events, users can be expected to exhibit a high degree of satisfaction and associated sentiment and accordingly their returned sentiment parameter values can be generally positive, hence the low negative sentiment parameter values of region A associated to a first location of sliding window 3206. However, embodiments herein recognize with respect to an entertainment crowd event, a disruptor individual can induce negative sentiment of users within the disruptor individual's immediate vicinity. The disruptor individual can be, e.g., yelling loudly using inappropriate language or otherwise "making a scene." Using the sliding window processing set forth in FIG. 4, it is recognized that a disrupted group and an associated disrupted region within a group can be provided using sliding window processing.

Referring to FIG. 4, it is seen that a group aggregate sentiment within the region at location M can have a value that exceeds a difference threshold with respect to the group aggregate negative sentiment value associated to region A of FIG. 4.

End of Example 2

Example 3

According to another example the behavior parameter values depicted in FIG. 4 can represent joy parameter values. Embodiments herein recognize that in a crowd event, such as an education crowd event, participating users can be exercising a high degree of concentration and exhibiting seriousness and may generally not return high joy sentiment parameter values.

Referring to FIG. 4 in such a scenario, region A can indicate joy sentiment parameters at a first region of an area 3202 and region M can indicate joy sentiment parameters at a second region of an area 3202. In the scenario described in Example 3, the disruptor at location 3208 is a user who is disrupting a region of the crowd and a group of users within the region of the crowd by entertaining the group of users within an otherwise serious crowd environment. The disruptor individual in the use case described, can be, e.g., displaying a funny video on his or her respective client computer device or telling a joke. Users in the vicinity of the disruptor individual in such a scenario can be responding, e.g., by laughing and smiling, and/or by texting their friends about the experience within a serious crowd environment. In the described scenario, a group aggregate joy parameter value within region can be 0.77 which can be a value which exceeds a difference threshold with respect to the group aggregate behavior value of 0.19 for area 3202.

In the described scenario of Example 3, wherein a crowd environment is generally serious, detecting a disruptor within disrupted region M can include application of various certain criterion. One criterion can include monitoring of network utilization levels of users within disrupted region M.

Embodiments herein recognize that disruptor individuals within disrupted regions can be individuals with high, e.g., above a threshold network utilization levels with respect to their respective client computer device, e.g., consuming network bandwidth by playing high bandwidth videos for the entertainment of others in their vicinity using their client computer device. Accordingly, one criterion that can be applied by manager system 110 for detecting a disruptor individual within a disrupted group at disrupted region M. In the described scenario of a serious crowd environment can include manager system 110 determining that a network utilization level of a user at location 3208 is the highest network traffic consuming location within disrupted region M.

In the scenario described, e.g. where there is a joyful disruptor individual disrupting a serious crowd, manager system 110 detecting a disruptor individual within a disrupted group located within a disrupted region can include manager system 110 performing lookback processing using historical data of data repository 112 to detect an individual within a disrupted region M who has continuously exhibited a threshold exceeding joy parameter value for a longest time period. For example, manager system 110 with reference to fictitious example data can examine joy sentiment parameter variance values for time T=t0, the current time, and can record that 8 individuals within region M have "joy" sentiment parameter values. Manager system 110 can then examine data at recent historical time periods T=t−1, T=t−2, T=t−3 and so on, at recent past historical interval time periods (e.g. 5 min time periods in past) from the current time. Manager system 110 can detect a disruptor on the basis of the disruptor continuously exhibiting the threshold exceeding joy "sentiment" parameter value for the longest period of time among individuals within the identified disrupted region M.

End of Example 3

Example 4

According to one example, the behavior parameter values depicted in FIG. 4 are network utilization level parameter values that specify network utilization levels of various users of area 3202. The embodiments herein recognize that a disrupted region M with reference to FIG. 4 can have higher network utilization levels than some areas of area 3202 outside of the disrupted region. For example, a typical user within area 3202 may engage in a low baseline level of network bandwidth utilization, e.g., comprising such actions as routine message checking. However, embodiments herein recognize that within a disrupted region, network utilization can increase.

For example, in one scenario, users within a disrupted region M with reference to FIG. 4, can be texting, can be messaging their friends at an increased rate regarding the disrupting event can be attempting to contact authorities or security personnel using their respective client computer devices can be researching using online resources resolutions to the disruptive event or according to one use case of a serious crown environment can be playing a video that was originally played by the disruptor. It can be seen that sliding window processing described with reference to FIG. 4 can be used to identify a disrupted region M using network utilization parameter values and sliding window processing. In reference to FIG. 4, a group aggregate network utilization parameter value for region M can be 0.77 which can exceed a threshold difference value (e.g. of 0.5 according to one embodiment) with respect to group aggregate network traffic parameter value of 0.19 for area 3202.

Various methodologies can be used for the detection of a disruptor individual within region M in the described scenario. According to applied one or more criterion for detection of a disruptor individual, the disruptor individual can be detected based on having the lowest network utilization parameter value within region M. For example, it can be expected according to one scenario that the disruptor individual can be too busy disrupting to be using his or her client computer device extensively.

According to another one or more applied criterion, the disruptor individual can be detected on the basis of having the highest average network utilization over a period of time starting from a historical time prior to the current time up until the current time. The historical time can be a threshold time, e.g., adaptively or predetermined threshold time from the current time.

Embodiments herein recognize that a disruptor individual in a crowd environment can be an individual who first finds and views an entertaining video demonstrates the video to others who then find and begin viewing the video causing a chain reaction of video viewers. The disruptor individual can be expected to have the highest network utilization or a period of time extending from the historical time to the current time based on having consumed bandwidth at video data consumption levels for the longest time among users within region M.

End of Example 4

According to another embodiment, biometric variance parameters can be used for identification of a disrupted group and/or detection of a disruptor. In Example 5, a use case is described where biometric variance parameters are used.

Example 5

According to one example, the behavior parameter values depicted in FIG. 4 are biometric variance parameter values that specify biometric variance parameter values of various users of area 3202. The embodiments herein recognize that a disrupted region M with reference to FIG. 4 can have higher group aggregate biometric parameter levels than some areas of area 3202 outside of the disrupted region.

For example, a typical user within area 3202 can exhibit a baseline level of biometric parameter value variance, e.g. can exhibit a heartrate slightly above normal for the individual as a result of entertainment provided at an entertainment event for example.

However, embodiments herein recognize that within a disrupted region, biometric variance can increase. For example, heart rates of individuals can increase as a result of stress induced by a disruptor.

It can be seen that sliding window processing described with reference to FIG. 4 can be used to identify a disrupted region M using biometric variance parameter values and sliding window processing. In reference to FIG. 4, a group aggregate biometric variance parameter value for region M can be 0.77 (specifying heartrate for example for another measured biometric parameter that can be measured by a body associated biometric sensor) which can exceed a threshold difference value (e.g. of 0.5 according to one embodiment) with respect to group aggregate biometric variance parameter value of 0.19 for area 3202.

Various methodologies can be used for the detection of a disruptor individual within region M in the described scenario. According to applied one or more criterion for detection of a disruptor individual, the disruptor individual can be detected based on having the lowest biometric variance parameter value within region M. For example, it can be expected according to one scenario that the disruptor individual can comfortable doing what the disruptor is currently doing, e.g. disrupting a crowd, and thus can be exhibiting a low level of biometric variance (e.g. a heartrate at a normal level for that individual).

According to another one or more applied criterion, the disruptor individual can be detected on the basis of having an above threshold biometric variance parameter for a longest time period within a disrupted region. Embodiments herein recognize that a disruptor exhibiting agitation and significant biometric variance may have been exhibiting such biometric variance for a longest period of time within a disrupted group prior to the disruptor's actions agitating others.

Manager system 110 detecting a disruptor individual within a disrupted group located within a disrupted region can include manager system 110 performing lookback processing using historical data of data repository 112 to detect an individual within a disrupted region M who has exhibited a threshold exceeding biometric variance parameter value for a longest time period. For example, manager system 110 with reference to fictitious example data can examine biometric variance parameter values for time T=t0, the current time, and can record that 5 individuals have biometric variance parameter values (e.g. for heartrate or another parameter). Manager system 110 can then examine data at time periods T=t−1, T=t−2, T=t−3 and so on, at interval time periods (e.g. 5 min time periods in past) from the current time. Manager system 110 can detect a disruptor individual on the basis of the disruptor exhibiting the threshold exceeding biometric variance parameter value for the longest period of time among individuals within the identified disrupted region M.

End of Example 5

It will be recognized that methodologies for identifying a disrupted group and region within an area and detecting disruptors can be combined. For example, methodologies can include combinations of data processing of different data types, e.g. including processing of combinations of sentiment parameter value processing, biometric variance parameter value processing, and/or network utilization level parameter value processing. Further, criterions employed for disrupted region identification and/or disruptor detection can include use of multiple types of behavior parameter values, e.g., sentiment type, biometric variance type, and/or network utilization level type.

Various one or more criterion for disruptor group identification and for disruptor individual detection are summarized herein in Table A.

TABLE A

| Methodology | Disrupted Region Discrimination Rule (one or more criterion) | Disruptor Discrimination Rule (one or more criterion) |
|---|---|---|
| I | Disrupted region within an area is identified based on a region having an aggregate sentiment value exceeding a difference threshold value set at 0.5 greater than area's group aggregate sentiment value. Anger sentiment parameter values are used. | Disruptor within a disrupted region is identified based on the disruptor having an anger sentiment parameter value lower than a difference threshold value set at 0.5 less than disrupted region's aggregate sentiment value. A sentiment value associated to the region differs from an aggregate sentiment value associated to the region by more than a difference threshold value. |
| II | Disrupted region within an area is identified based on a region having an aggregate sentiment value exceeding a difference threshold value set at 0.5 greater than area's group aggregate sentiment value. Positive/Negative polarity sentiment parameter values are used. | Disruptor within a disrupted region is identified based on the disruptor having an anger sentiment parameter value lower than a difference threshold value set at 0.5 less than disrupted region's aggregate sentiment value. Positive/Negative polarity sentiment parameter values are used. A sentiment value associated to the region differs from an aggregate sentiment value associated to the region by more than a difference threshold value. |
| III | Disrupted region within an area is identified based on a region having an aggregate sentiment value exceeding a difference threshold value set at 0.5 greater than area's group aggregate sentiment value. Anger sentiment parameter values are used. | Disruptor within a disrupted region is identified based on the candidate disruptor having an anger sentiment parameter value lower than a difference threshold value set at 0.5 less than disrupted region's aggregate sentiment value and further based on the candidate disruptor having a joy parameter value exceeding 0.5. A sentiment value associated to the region differs from an aggregate sentiment value associated to the region by more than a difference threshold value. |
| IV | Disrupted region within an area is identified based on a region having an aggregate sentiment value exceeding a difference threshold value set at 0.5 greater than area's group aggregate sentiment value. Anger sentiment parameter values are used. | Disruptor within a disrupted region is identified based on the candidate disruptor having a joy parameter value exceeding 0.8. |
| V | Disrupted region within an area is identified based on a region having an aggregate sentiment value exceeding a difference threshold value set at 0.5 greater than area's group aggregate sentiment value. Joy sentiment parameter values are used. | Disruptor within a disrupted region is identified based on the candidate disruptor having a joy parameter value exceeding 0.7 for a longest continuous time period among users within the disrupted region. |
| VI | Disrupted region within an area is identified based on a region having an aggregate sentiment value exceeding a difference threshold value set at 0.5 greater than area's group aggregate sentiment value. Positive/Negative polarity sentiment parameter values are used. | Disruptor within a disrupted region is identified based on the disruptor having an anger sentiment parameter value lower than a difference threshold value set at 0.5 less than disrupted region's aggregate sentiment value. Positive/Negative polarity sentiment parameter values are used. A sentiment value associated to the region differs from an aggregate sentiment value associated to the region by more than a difference threshold value. Biometric variance data is also examined. A candidate disruptor is qualified as a |

TABLE A-continued

| Methodology | Disrupted Region Discrimination Rule (one or more criterion) | Disruptor Discrimination Rule (one or more criterion) |
|---|---|---|
| | | detected disruptor only on the criterion being satisfied that the candidate disruptor has a biometric variance parameter value (heartrate based) exceeding 0.7. |
| VII | Disrupted region within an area is identified based on a region having a network utilization level value exceeding a difference threshold value set at 0.5 greater than area's group aggregate network utilization level value. | Disruptor within a disrupted region is identified based on a candidate disruptor exhibiting a threshold exceeding network utilization level for a longest time period within the identified disrupted region. |
| VIII | Disrupted region within an area is identified based on a region having a biometric variance value exceeding a difference threshold value set at 0.5 greater than area's group aggregate biometric variance value. | Disruptor within a disrupted region is identified based on a candidate disruptor exhibiting a threshold exceeding biometric variance value for a longest time period within the identified disrupted region. |
| IX | Disrupted region within an area is identified based on a region having an aggregate sentiment value exceeding a difference threshold value set at 0.5 greater than area's group aggregate sentiment value. Positive/Negative polarity sentiment parameter values are used. | Disruptor within a disrupted region is identified based on the disruptor having an anger sentiment parameter value lower than a difference threshold value set at 0.5 less than disrupted region's aggregate sentiment value. Positive/Negative polarity sentiment parameter values are used. A sentiment value associated to the region differs from an aggregate sentiment value associated to the region by more than a difference threshold value. A candidate disruptor is qualified as a detected disruptor only on the criterion being satisfied that the candidate disruptor has a biometric variance parameter value (heartrate based) exceeding 0.7. |
| X | Disrupted region within an area is identified based on a region having a biometric variance value exceeding a difference threshold value set at 0.5 greater than area's group aggregate biometric variance value. | Disruptor within a disrupted region is identified based on a candidate disruptor exhibiting a threshold exceeding biometric variance value for a longest time period within the identified disrupted region. A candidate disruptor is qualified as a detected disruptor only on the additional criterion being satisfied that the candidate disruptor has an anger sentiment parameter value exceeding 0.7. |
| . . . | . . . | . . . |

Manager system 110 at block 1106 can return an action decision specifying one or more action for mitigation of a disruption caused by a disruptor individual. Manager system 110 can return action decisions using a decision data structure stored in decision data structures area 2127 of data repository 112. An example of a decision data structure is set forth in Table B herein below.

TABLE B

| Methodology | Action decision |
|---|---|
| I | A, B, C |
| II | B, E |
| III | A |
| IV | B, F, G |
| . . . | . . . |

Referring to Table B, manager system 110 can return an action decision based on a decision profile used for the determination of a disrupted group and of the disruptor individual as set forth in Table A. For example, where a first methodology is used for identification of a disrupted region and detection of a disruptor individual, a first action decision can be returned. If a second methodology is used for the identification of a disrupted region and a detected disruptor individual within the disrupted region second action decision can be returned and so on. Manager system 110, according to one embodiment, can be configured to try each of several methodologies for identification of a disrupted group and/or detection of a disruptor (e.g. can try each of the methodologies I-X of Table A), or can try only select ones of possible methodologies using a priori knowledge of a crowd event.

One or more action, e.g. actions A-G can be associated to each action decisions. Actions can include e.g. sending a message to one more user of a client computer device 130A-130Z using a messaging system, where a user can be a disruptor user or another other, throttling network bandwidth, activating an audio message on a public announcement address system, displaying a message on a publicly viewable message board (e.g. large scoreboard), activating a message to security including law enforcement personnel altering the security personnel to take action, activating a message to a venue so that a performance at live event can be adjusted (a speaker at a crowd event can be delivered a text based message instructing the speaker to directly address the disruptor), activating physical ingress and/or egress barriers for crowd control, e.g. to avoid an increase in population at a disrupted region.

Messages to a client computer device of as disruptor can include messages to induce the disruptor to stop the disruptive activity. Message content can be content to redirect the attention of a disruptor, e.g. can take the form of a message to advertise of a promotion in an interest area of the disruptor. Manager system 110 can examine disruptor profiles data of disruptors area 2124 to determine message content. For example, manager system 110 examining disruptors area 2124 can determine that a disruptor has a user preference for classic cars, and can responsively send a message to a detected disruptor prompting the disruptor to travel to a central location of a current crowd event venue to pick up a coupon to attend a classic car event.

Messages to user client computer devices of users in a vicinity of a disruptor individual within a disrupted region can include messages to assist the users in inducing the disruptor to stop the disruptive activity. Messages can include text based messages instructing users on how to interact with the disruptor, e.g. including instructions on spoken content to direct to the disruptor. Messages can include text based messages instructing users on how to engage assistance from security personnel. The messages can be adaptive based on specific current behavior patterns of the disruptor which can be detected using video data processing.

Messages can alternatively and additionally be sent for public dissemination e.g. to a public address system for audio messages and to a public display screen (e.g. scoreboard) for publicly viewable messages. Manager system 110 can provide one or more output to output a publicly disseminated message in response to an examination of the disruptor profile data of disruptors area 2124. For example, manager system 110 examining disruptors area 2124 can determine that a disruptor has a user preference for classic cars, and can responsively send for public observance message data prompting all users to travel to a central location of a current crowd event venue to pick up a coupon to attend a classic car event.

Manager system 110 at block 1106 can provide one or more disruptor mitigation output. Manager system 110 at block 1106 can determine and/or provide, by machine logic, a disruptor mitigation output e.g. in accordance with a returned decision provided using a decision data structure as set forth in Table B. In some embodiments, providing a disruptor mitigation output may include transmitting a message e.g. a text based message to at least the individual disruptor. For example, manager system 110 at block 1303 may send a notification on at least a computer device of client computer devices 130A-130Z associated with the disruptor individual. As another example, a notification may be transmitted to and displayed on a display of a computer device of client computer devices 130A-130Z of an individual that is within or not within the disrupted group of the crowd, or a computer device associated with an individual that does not form part of the disrupted group of the crowd and/or the crowd as a whole or a display device positioned within or about the location of the crowd (but may be within a viewing area of the disruptor individual such that the disruptor individual can see the notification). For example, a notification may be a motivational message designed to alter (or induce a change) in the disrupting behavior of at least the individual disruptor of the disrupted group. As another example, a notification may be a message designed to physically remove (or induce physical removal of) the individual disruptor from the disrupted group, such as to prevent or stop the disruptor individual from affecting the sentiments and/or emotional arousal states of the disrupted group.

Providing a disruptor mitigation output at block 1106 may include reducing available bandwidth to at least one computer device of computer devices 130A-130Z associated with the disruptor individual. For example, manager system 110 at block 1106 may reconfigure at least a computer device of client computer devices 130A-130Z associated with the disruptor individual such that the maximum or available bandwidth achieved by the device is reduced (e.g., slowed or stopped in total). As another example, manager system 110 at block 1106 may reconfigure one or more connection node 137 associated with the location to reduce the maximum or available bandwidth to at least one computer device of client computer devices 130A-130Z associated with the disruptor individual. For reconfiguring one or more connection node 137 to restrict available bandwidth for reduction of network utilization through one or more connection node 137 manager system 110 at block 1106 can send an appropriate command communication for receipt by one or more connection node 137 at block 1372. As noted above, internet use by a disruptor individual may affect, distract or otherwise alter the behavior individuals of the crowd. By reducing (potentially eliminating) available bandwidth to at least a computer device of client computer devices 130A-130Z associated with the disruptor individual, manager system 110 can prevent or stop the disruptor individual's internet use from affecting the behavior of the disrupted group.

As indicated by the decision data structure to Table B, disruptor mitigation output provided by manager system 110 at block 1106 may be based on the behavior of the disruptor individual as determined using behavior parameter values, which can include e.g. sentiment parameter values, biometric variance parameter values and/or network utilization level parameter values.

Manager system 110 at block 1107 can determine if the provided mitigation output mitigated the disrupting effect of a disruptor. If manager system 110 determines that the provided mitigation output did mitigate the disruptor individual of the disrupted group, the manager system 110 can determine if the event is still in progress at block 1108. If the event is still in progress, the manager system 110 may proceed to block 1104 to perform a next iteration of determining whether any disrupted groups are present within the crowd. If at block 1104 manager system 110 does not determine that a disrupted group is present within the crowd, the manager system 110 can iteratively re-check for the presence of disrupted groups and/or disruptors until a disrupted group is determined or the event is no longer in process. Manager system 110 can terminate disruptor mitigation services for an event at block 1109 based on the determination at block 1108 that the event is no longer in progress.

As shown in FIG. 4, in some embodiments, if the manager system 110 determines that the provided mitigation output did not mitigate the disruptor individual's effect on the behavior of the disrupted group and/or the disruptor, manager system 110 can return to block 1105 to re-evaluate or re-determine a disruptor individual with the disrupted group, and, if a disrupted group and disruptor individual is determined, proceed to block 1106 to provide another disruptor mitigation output (which may differ than the previously provided disruptor mitigation output). In some other embodiments, if manager system 110 determines that the provided mitigation output did not mitigate the individual's effect on the sentiments and/or emotional arousal states of a disrupted group (that still exists), the manager system 110 can return directly to block 1106 to provide another disruptor mitigation output (which may differ than the previously provided disruptor mitigation output). The decision data structure of Table A can be populated with addition row entries which alter the returned action decision in dependence on the iteration of the disrupted group identification and disruptor detector attempt (the returned action may be different if the disrupted group is identified in response to an Nth attempt to identify a disrupted group rather than the N−1th attempt).

In these ways, the manager system 110 at block 1107 may iteratively determine a disrupted group and/or a disruptor individual and provide mitigation outputs based thereon and iteratively check or re-determine if the last or previously provided mitigation output mitigated (or induced mitigation of) the disruptor individual's effect on the behavior of the disrupted group.

Manager system 110 at block 1107 can determine if the provided mitigation output successfully mitigated a behavior resulting in identification of a disrupted group and/or detection of a disruptor. In some embodiments, for determination of whether a mitigation output has been successful, manager system 110 at block 1107 may determine if a group aggregate behavior parameter value for an identified disrupted region has returned to level that does not trigger identification of the disrupted region. In some embodiments, for determination of whether a mitigation output has been successful, manager system 110 at block 1107 may determine if a behavior parameter value for a disruptor has returned to level that does not trigger detection of the disruptor as a disruptor individual.

Manager system 110 provides the mitigation output at block 1106 and determines if the provided mitigation output mitigated (or induced mitigation of) the effect of the disruptor individual to the behavior of a disrupted group and/or to a disruptor. Manager system 110 can update a disruptor database (e.g., disruptor area 2124) with relevant behavior parameter values, mitigation output identifiers, and an indication of the determination of whether for a given mitigation output, group and/or disruptor behavior was successfully altered by the disruptor mitigation output. Data of disruptors area 2124 can be examined to determine a disruptor mitigation output at block 1106 based on previously provided disruptor mitigation outputs that were successful in altering (or inducing a change in) the behavior of disrupted group and/or the disruptor.

In some embodiments, manager system 110 may run a reinforcement model by activation of machine learning process (not shown) to provide disruptor mitigation outputs based on prior provided mitigation outputs, such as to provide disruptor mitigation outputs that are more likely to alter behavior group by more likely inducing a change in the behavior of the disruptor individual. For example, a machine learning process performed by manager system 110 can include one or more processes to train one or more reinforcement model. According to one embodiment as shown in FIG. 5, manager system 110 can iteratively train a reinforcement model 7004 using historical data stored in data repository 112.

Figure 5:
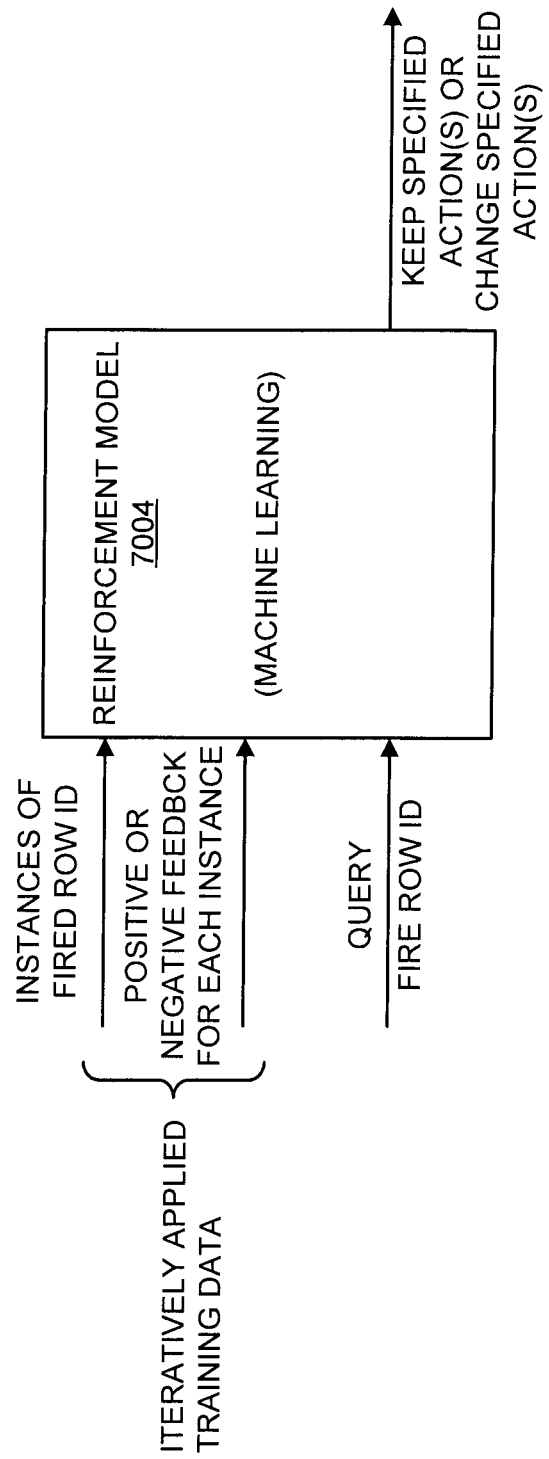
FIG. 5 depicts a predictive model trained by machine learning according to one embodiment.

Referring to FIG. 5, manager system 110 can iteratively train reinforcement model 7004 using iteratively applied training data. The iteratively applied training data can include instances of fired rows of a decision data structure and a positive or negative feedback associated with each instance. Thus, whenever a row of a decision data structure including disruptor mitigation outputs is fired to return a specified one or more action, a positive or negative feedback associated to the one or more action can be applied as training data to train reinforcement model 7004.

The positive or negative feedback can vary depending on the specified action. Where the action specified is a disruptor mitigation output, the positive or negative feedback can specify whether the disruptor mitigation output altered the sentiments of the disrupted group by inducing a change in the sentiment of the disruptor individual. A successful alteration/change in the behavior of the identified disrupted group and/or detected disruptor can indicate a positive feedback for the disruptor mitigation output, and failure to alter/change the sentiments of the disrupted group can indicate a negative feedback associated with the disruptor mitigation output.

Upon being trained, reinforcement model 7004 can be responsive to queries by manager system 110. Manager system 110 can be configured to iteratively query the reinforcement model 7004 as depicted in FIG. 5, at intervals, e.g. configurable intervals configurable with use of administrator user interface displayed on administrator computer device 125. In response to being queried with a row X ID, reinforcement model 7004 can return a response to provide one or more action specifier for row X. The response can specify that the current action is to be maintained, e.g. in the case the feedback over the course of iterations for the specified action has been positive or can specify a change in an action specifier(s), e.g. in the case that over the course of iterations there has been negative feedback associated with the current action(s). A new action specifier can be obtained from a list, e.g. an administrator authored list authored using administrator computer device 125 or an automatically generated list generated with use of machine learning process. The decision data structure is expected to stabilize when the decision data structure specifies well performing action decisions. Manager system 110 can automatically update the decision data structure e.g. as shown in Table B in the case that query of reinforcement model 7004 indicates that the decision data structure is to be updated.

Various available tools, libraries, and/or services can be utilized for implementation of reinforcement model 7004. For example, a machine learning service can provide access to libraries and executable code for support of machine learning functions. A machine learning service can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models.

Certain embodiments herein may offer various technical computing advantages, involving computing advantages to address problems arising in the realm of computer systems and networks including in the environment of computer-assisted crowd and/or event monitoring and control. Individuals typically gather (i.e., crowds typically form) at a location (e.g., a venue) for an event. An event is typically a planned happening or occasion to which the individuals/crowd watches, listens or otherwise pays attention to. There is typically a desired/preferred and/or optimal behavior of the individuals/crowd of an event that best achieves the purpose or mission of the event (e.g., from the perspective of the individuals themselves and/or an organizer or administrator of the event). Unfortunately, the behavior of the individuals/crowd of an event can be affected by one or more disruptor individual of the crowd. For example, a disruptor individual can degrade the behavior of individuals of the crowd that are physically positioned proximate to the disruptor individual (i.e., co-located), such as individuals that are positioned within their vision and/or hearing range of the disruptor individual. Embodiments herein can improve computer-assisted monitoring and control of crowds that mitigate the effect of a disruptor individual (e.g., the disruptor individual's sentiment) on the behavior of other individuals of the crowd, such as to mitigate degrading behavior caused by the disruptor individual. Embodiments herein can include a computer-assisted crowd monitoring and mitigating system computer system that automatically, in real-time, determines and mitigates the effect of disruptor individuals to other individuals of the crowd, and thereby enhances the experience of the individuals of the crowd at an event. Embodiments can alleviate dangerous crowd conditions at an event such as crowd conditions that frustrate ingress and egress from various locations at an event. Embodiments herein can employ data structuring processes, e.g. sentiment analysis, which can be used to tag processed content with determined sentiment parameters and parameter values. Embodiments herein can for example feature crowdsourced rules so that determinations provided by a computer system (e.g., behavior parameter values and/or disruptor mitigation outputs) accurately account for varying perspectives of a plurality of users. Embodiments herein can provide results and advantages that are not possible or practical without use of components of a technical computing environment, such as providing for decision making using fact items that human users cannot practically or possibly access. Embodiments herein can include artificial intelligence processing platforms featuring improved processes to transform unstructured data into structured form permitting computer-based analytics and predictive decision making. Embodiments herein also can include machine learning platforms that leverage historical data for improved predictive analytics.

Figure 6:
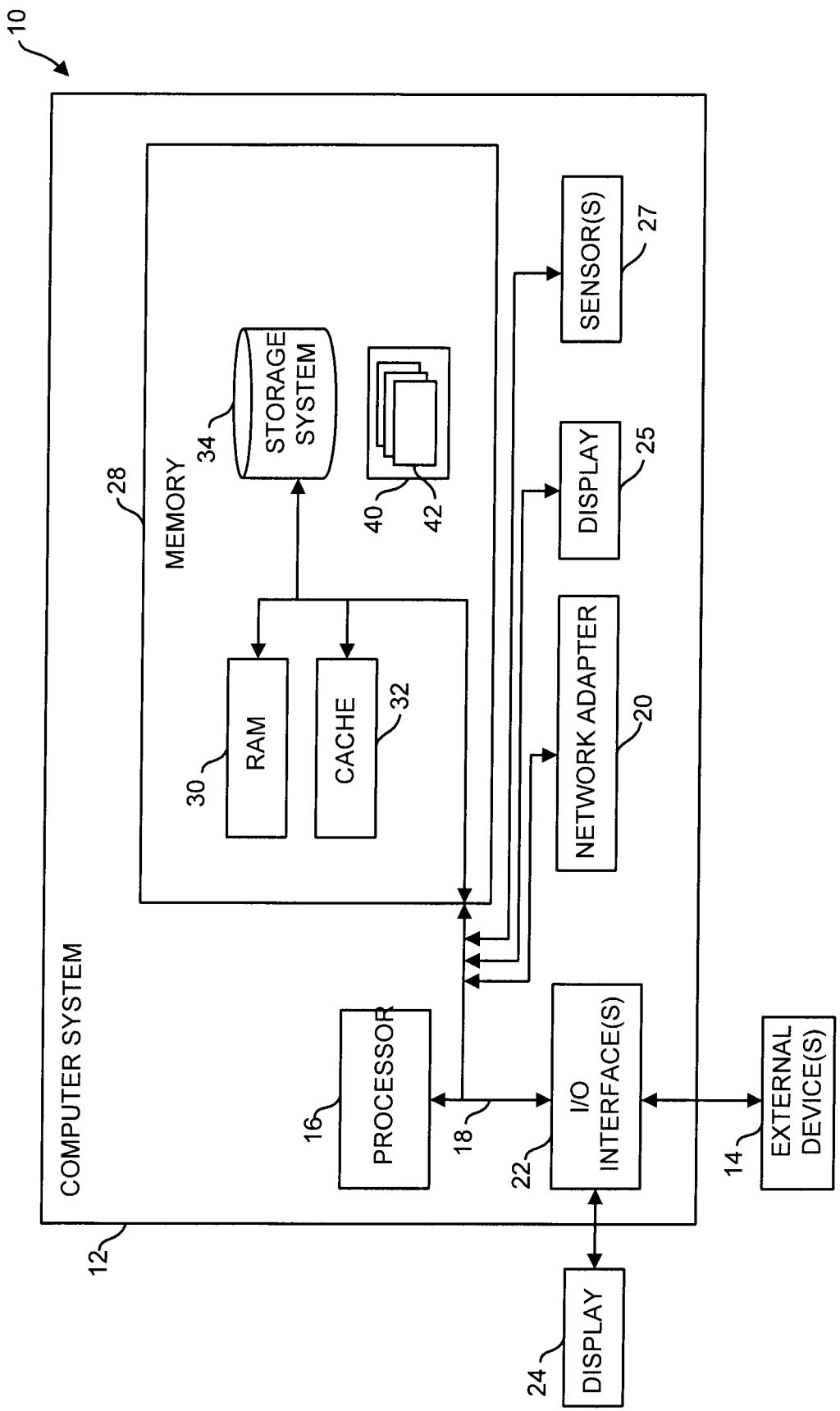
FIG. 6 depicts a computing node according to one embodiment.
Figure 7:
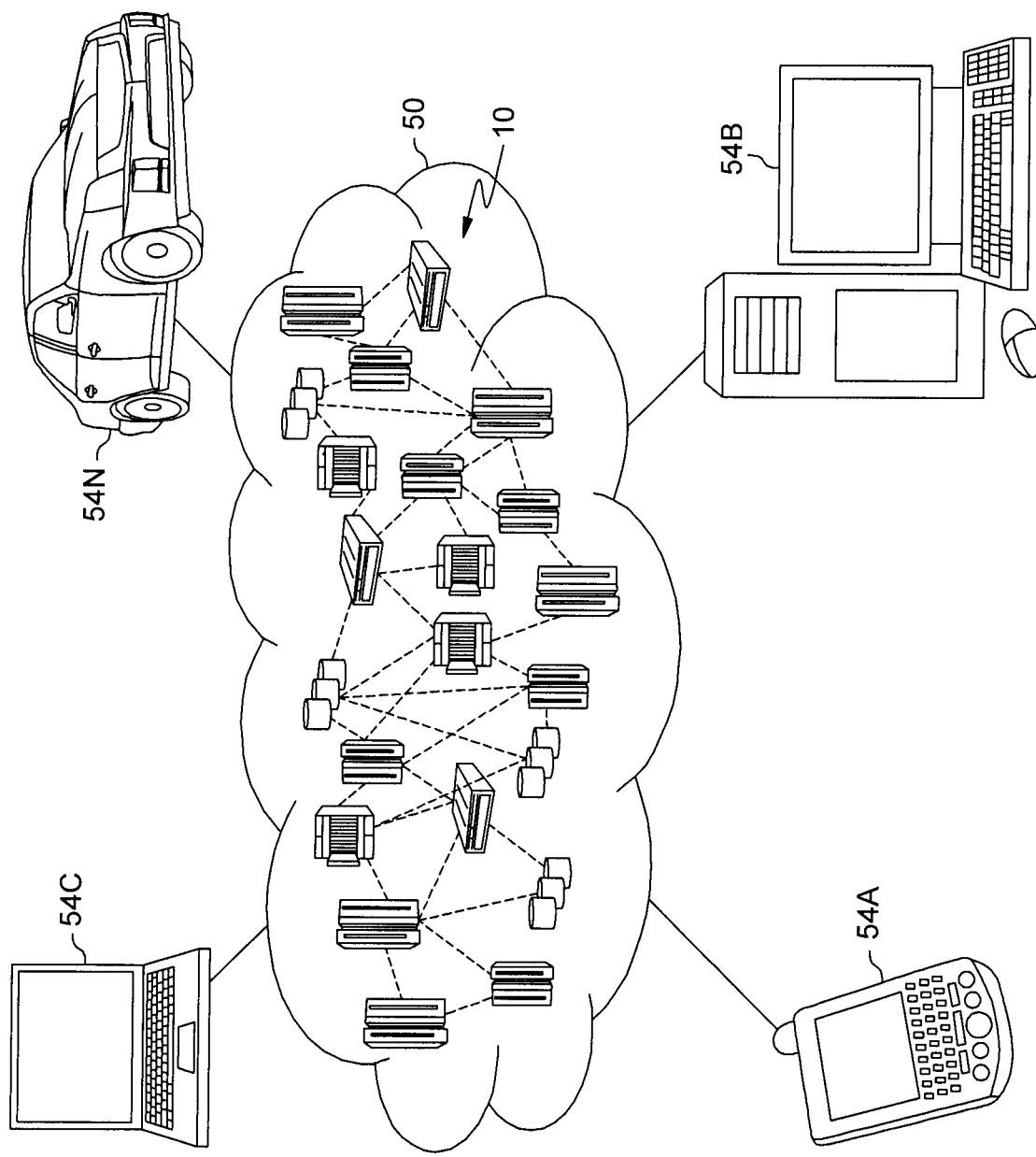
FIG. 7 depicts a cloud computing environment according to one embodiment.
Figure 8:
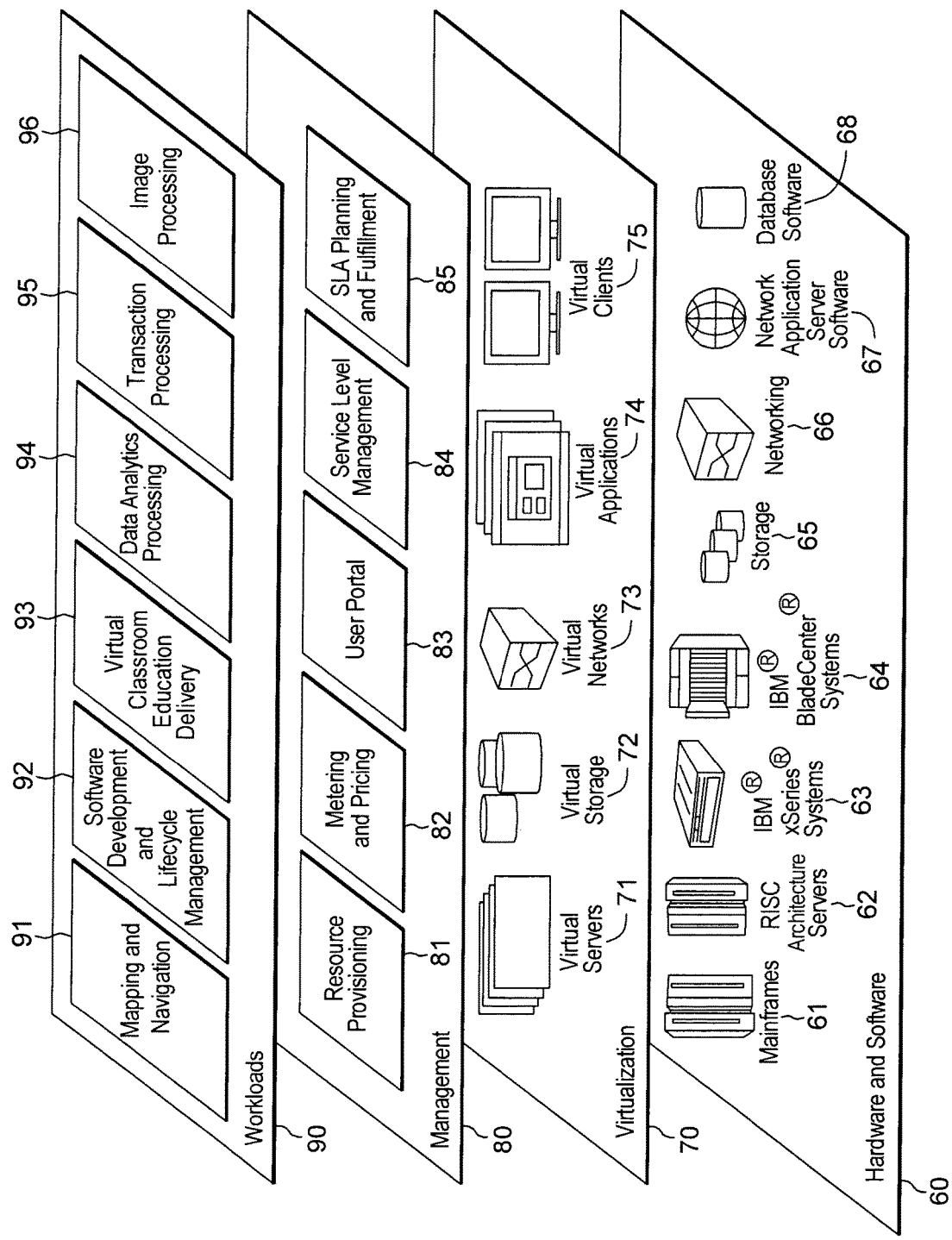
FIG. 8 depicts abstraction model layers according to one embodiment.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or it can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 7-8.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in system memory 28 by way of example, and not limitation, as well as an operating system, one or more application programs, other program processes, and program data. One or more program 40 including program processes 42 can generally carry out the functions set forth herein. One or more program 40 can define machine logic. In one embodiment, manager system 110 can include one or more computing node 10 and can include one or more program 40 for performing functions described with reference to method 200 of FIG. 2, and the functions described with reference to manager system 110 as set forth in the flowchart of FIGS. 3A-3B. In one embodiment, one or more client computer device 130A-130Z can include one or more computing node 10 and can include one or more program 40 for performing functions described with reference to one or more client computer device 130A-130Z as set forth in the flowchart of FIGS. 3A-3B. In one embodiment, video camera system 135 can include one or more computing node 10 and can include one or more program 40 for performing functions described with reference to video camera system 135 as set forth in the flowchart of FIGS. 3A-3B. In one embodiment, social media system 140 can include one or more computing node 10 and can include one or more program 40 for performing functions described with reference to social media system 140 as set forth in the flowchart of FIGS. 3A-3B. In one embodiment, connection node 137 can include one or more computing node 10 and can include one or more program 40 for performing functions described with reference to connection node 137 as set forth in the flowchart of FIGS. 3A-3B. In one embodiment, administrator client computer device 125 can include one or more computing node 10 and can include one or more program 40 for performing functions described with reference to administrator client computer device 125 as set forth in the flowchart of FIGS. 3A-3B. In one embodiment, the computing node based devices of FIG. 1 can include one or more computing node 10 and can include one or more program 40 for performing functions described in respect to the various computing node based devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/

Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a heartrate sensor, a blood pressure (bp) sensor or an audio input device. Computer system 12 can include one or more network adapter 20. In FIG. 7 computing node 10 is described as being implemented in a cloud computing environment and accordingly is referred to as a cloud computing node in the context of FIG. 7.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
obtaining one or more data feed that includes data of individuals within a crowd, wherein the crowd comprises a plurality of individuals gathered within an area;
examining data of the one or more data feed to return behavior parameter values for respective individuals of the plurality of individuals;
identifying, using values of the behavior parameter values, a disrupted group of a plurality of the individuals of the crowd, wherein the identifying is in dependence on a first one or more criterion being satisfied;
detecting, using values of the behavior parameter values, a disruptor individual within the disrupted group, the detecting in dependence on a second one or more criterion being satisfied; and
providing, by machine logic, one more disruptor mitigation output to mitigate disruptive behavior of the disruptor individual, wherein the behavior parameter values for respective individuals of the crowd include sentiment parameter values, and wherein providing parameter values of the sentiment parameter values includes processing a video data stream provided by one or of more video camera for obtaining video image data representation of the crowd, wherein the processing the video data stream includes processing video data to return facial expression based sentiment parameter values for users within the crowd.

2. A method comprising:
obtaining one or more data feed that includes data of individuals within a crowd, wherein the crowd comprises a plurality of individuals gathered within an area;
examining data of the one or more data feed to return behavior parameter values for respective individuals of the plurality of individuals;
identifying, using values of the behavior parameter values, a disrupted group of a plurality of the individuals of the crowd, wherein the identifying is in dependence on a first one or more criterion being satisfied;
detecting, using values of the behavior parameter values, a disruptor individual within the disrupted group, the detecting in dependence on a second one or more criterion being satisfied; and
providing, by machine logic, one more disruptor mitigation output to mitigate disruptive behavior of the disruptor individual.

3. The method of claim 2, wherein the providing, by machine logic, one more disruptor mitigation output includes providing one or more output to send a text based message to a client computer device of the disruptor individual prompting redirection of activity of the disruptor individual.

4. The method of claim 2, wherein the providing, by machine logic, one more disruptor mitigation output includes providing one or more output to present a publicly observable message observable by individuals of the crowd prompting redirection of activity of the disruptor individual.

5. The method of claim 2, wherein the providing, by machine logic, one more disruptor mitigation output includes providing one or more output to send a text based message to a client computer device of a certain individual in proximity with the disruptor individual, the text based message instructing the certain individual in respect to interactions with the disruptor individual.

6. The method of claim 2, wherein the providing, by machine logic, one more disruptor mitigation output includes providing one or more output to send a text based message to a client computer device of the disruptor individual prompting redirection of activity of the disruptor individual, wherein the text based message is in dependence on historical data stored in a data repository specifying preferences of the disruptor individual, wherein the method includes performing video data processing to return an identifier for the disruptor individual, returning a preference for the disruptor individual using the identifier, and providing the text based message in dependence on the identifier.

7. The method of claim 2, wherein the providing, by machine logic, one more disruptor mitigation output includes providing one or more output to activate a physical barrier within the area to redirect traffic of the crowd within the area.

8. The method of claim 2, wherein the behavior parameter values for respective individuals of the crowd include sentiment parameter values, and wherein providing parameter values of the sentiment parameter values includes processing a video data stream provided by one or of more video camera for obtaining video image data representation of the crowd.

9. The method of claim 2, wherein the behavior parameter values for respective individuals of the crowd include sentiment parameter values, and wherein providing parameter values of the sentiment parameter values includes processing text based data provided by users of the crowd, text based data selected from the group consisting of social media postings and text based messages delivered by a messaging system.

10. The method of claim 2, wherein the behavior parameter values for respective individuals of the crowd include network utilization level parameter values, and wherein providing parameter values of the network utilization parameter values includes monitoring data uploads from and data downloads to client computer devices of individuals within the crowd.

11. The method of claim 2, wherein the behavior parameter values for respective individuals of the crowd include biometric variance parameter values, and wherein providing parameter values of the biometric variance parameter values includes processing biometric sensor outputs from integrated biometric sensors of wearable client computer devices being worn by users of the crowd.

12. The method of claim 2, wherein the first one or more criterion includes the criterion that a group aggregate sentiment parameter value associated to the group differs from a group aggregate sentiment parameter value associated to the crowd gathered in the area by more than a difference threshold value.

13. The method of claim 2, wherein the second one or more criterion includes the criterion that a sentiment value associated to the disruptor individual differs from an aggregate sentiment value associated to disrupted group by more than a difference threshold value.

14. The method of claim 2, wherein the first one or more criterion includes the criterion that a group aggregate behavior parameter value associated to the disrupted group differs from a group aggregate behavior parameter value associated to the crowd within the area by more than a difference threshold value, and wherein the second one or more criterion includes the criterion that a candidate disruptor individual among the disrupted group has exhibited a threshold exceeding behavior parameter value than has been exhibited by second candidate disruptor individual among the disrupted group.

15. The method of claim 2, wherein the identifying includes using moving window processing, wherein each window is a candidate disrupted region, and wherein the method includes calculating group aggregate sentiment values for each window and comparing the group aggregate sentiment values for each window to a group aggregate sentiment for the crowd within the area.

16. The method of claim 2, wherein the first one or more criterion includes the criterion that a group aggregate behavior parameter value associated to the disrupted group differs from a group aggregate behavior parameter value associated to the crowd within the area by more than a difference threshold value, and wherein the second one or more criterion includes the criterion that a candidate disruptor individual among the disrupted group has exhibited a threshold exceeding behavior parameter value for a longest time period among users with the disrupted group, wherein the providing, by machine logic, one more disruptor mitigation output includes providing one or more output to send a text based message to a client computer device of the disruptor individual prompting redirection of activity of the disruptor individual, wherein the text based message is in dependence on historical data stored in a data repository specifying preferences of the disruptor individual, wherein the method includes performing video data processing to return an identifier for the disruptor individual, returning a preference for the disruptor individual using the identifier, and providing the text based message in dependence on the identifier.

17. The method of claim 2, wherein the method includes deciding the one more disruptor mitigation output using a decision data structure that cognitively maps a methodology used for determination of one or more or the disrupted group or the disruptor individual to specified one or more action associated to the methodology, wherein the method includes using predictive model trained by machine learning for updating the decision data structure, wherein the method includes iteratively checking data of the one or more data feed to determine whether the one or more disruptor mitigation output has been successful and iteratively adjusting the one or more disruptor mitigation output in response to respective iterative determinations that the one or more disruptor mitigation output has not been successful.

18. The method of claim 2, wherein the one or more data feed includes a data feed from a data source selected from the group consisting of (a) client computer devices of the individuals of the crowd, (b) a video camera system oriented to capture video data representations of the crowd, (c) a social media system, and (d) a network resource that monitors network utilization levels of the individuals of the crowd.

19. The method of claim 2, wherein the one or more data feed includes a data feed from each of the following data sources: (a) client computer devices of the individuals of the crowd, (b) a video camera system oriented to capture video data representations of the crowd, (c) a social media system, and (d) a network resource that monitors network utilization levels of the individuals of the crowd.

20. A system comprising:
a memory;
at least one processor in communication with the memory; and
program instructions executable by one or more processor via the memory to perform a method comprising:
obtaining one or more data feed that includes data of individuals within a crowd, wherein the crowd comprises a plurality of individuals gathered within an area;
examining data of the one or more data feed to return behavior parameter values for respective individuals of the plurality of individuals;
identifying, using values of the behavior parameter values, a disrupted group of a plurality of the individuals of the crowd, wherein the identifying is in dependence on a first one or more criterion being satisfied;
detecting, using values of the behavior parameter values, a disruptor individual within the disrupted group, the detecting in dependence on a second one or more criterion being satisfied; and
providing, by machine logic, one more disruptor mitigation output to mitigate disruptive behavior of the disruptor individual.

* * * * *